(12) United States Patent
Santamaria-Pang et al.

(10) Patent No.: US 8,995,740 B2
(45) Date of Patent: Mar. 31, 2015

(54) SYSTEM AND METHOD FOR MULTIPLEXED BIOMARKER QUANTITATION USING SINGLE CELL SEGMENTATION ON SEQUENTIALLY STAINED TISSUE

(71) Applicant: General Electric Company, Schenectady, NY (US)

(72) Inventors: Alberto Santamaria-Pang, Schenectady, NY (US); Jens Rittscher, Niskayuna, NY (US); Dirk Padfield, Niskayuna, NY (US); Ali Can, Niskayuna, NY (US); Zhengyu Pang, Niskayuna, NY (US); Musodiq Bello, Niskayuna, NY (US); Fiona Ginty, Niskayuna, NY (US); Christopher Sevinsky, Watervliet, NY (US); Qing Li, Niskayuna, NY (US); Megan Rothney, Madison, WI (US); Brion Sarachan, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 170 days.

(21) Appl. No.: 13/865,036

(22) Filed: Apr. 17, 2013

(65) Prior Publication Data

US 2014/0314299 A1 Oct. 23, 2014

(51) Int. Cl.
*G06K 9/00* (2006.01)
*G06T 7/00* (2006.01)
*G01N 33/574* (2006.01)

(52) U.S. Cl.
CPC ............ *G06K 9/0014* (2013.01); *G06T 7/0012* (2013.01); *G06T 2207/10064* (2013.01); *G06T 2207/30024* (2013.01)
USPC ............................ 382/133; 382/274; 435/7.23

(58) Field of Classification Search
USPC ......... 382/100, 103, 106–107, 133–134, 154, 382/162, 168, 173, 181, 199, 203, 209, 219, 382/232, 254, 274, 276, 285, 291, 305, 312, 382/171, 128; 435/7.23, 34
See application file for complete search history.

(56) References Cited

U.S. PATENT DOCUMENTS 6,956,961 B2 * 10/2005 Cong et al. ..................... 382/133
7,151,847 B2 12/2006 Vaisberg et al.
(Continued)

FOREIGN PATENT DOCUMENTS

EP 1699016 A2 9/2006

OTHER PUBLICATIONS

Lin G. et al, A Multi-Model Approach to Simultaneous Segmentation and Classification of Heterogeneous Populations of Cell Nuclei in 3D Confocal Microscope Images, Journal for International Society for Analytical Cytology, 71A, p. 724-736, 2007.
(Continued)

*Primary Examiner* — Seyed Azarian
(74) *Attorney, Agent, or Firm* — Eileen B. Gallagher

(57) ABSTRACT

Improved systems and methods for the analysis of digital images are provided. More particularly, the present disclosure provides for improved systems and methods for the analysis of digital images of biological tissue samples. Exemplary embodiments provide for: i) segmenting, ii) grouping, and iii) quantifying molecular protein profiles of individual cells in terms of sub cellular compartments (nuclei, membrane, and cytoplasm). The systems and methods of the present disclosure advantageously perform tissue segmentation at the sub-cellular level to facilitate analyzing, grouping and quantifying protein expression profiles of tissue in tissue sections globally and/or locally. Performing local-global tissue analysis and protein quantification advantageously enables correlation of spatial and molecular configuration of cells with molecular information of different types of cancer.

24 Claims, 24 Drawing Sheets

(56) References Cited

U.S. PATENT DOCUMENTS

| | | | |
|---|---|---|---|
| 7,933,435 B2* | 4/2011 | Hunter et al. | 382/128 |
| 7,949,474 B2 | 5/2011 | Callahan et al. | |
| 2006/0127881 A1 | 6/2006 | Wong et al. | |
| 2006/0204953 A1 | 9/2006 | Ptitsyn | |
| 2007/0058836 A1 | 3/2007 | Boregowda et al. | |
| 2007/0202519 A1 | 8/2007 | Rao et al. | |
| 2008/0031521 A1 | 2/2008 | Can et al. | |
| 2008/0032321 A1 | 2/2008 | Ginty et al. | |
| 2009/0238457 A1* | 9/2009 | Rittscher et al. | 382/171 |
| 2009/0297015 A1 | 12/2009 | Jetzek | |
| 2010/0111396 A1* | 5/2010 | Boucheron | 382/133 |
| 2011/0038523 A1 | 2/2011 | Boardman | |
| 2011/0091081 A1 | 4/2011 | Sarachan et al. | |
| 2011/0123090 A1 | 5/2011 | Zerfass et al. | |
| 2011/0249883 A1 | 10/2011 | Can et al. | |
| 2011/0286654 A1 | 11/2011 | Krishnan | |
| 2012/0269418 A1 | 10/2012 | McCulloch | |
| 2013/0051650 A1 | 2/2013 | Santamaria-Pang | |

OTHER PUBLICATIONS

Nasr-Isfahani, S. et al, A New Approach for Touching Cells Segmentation, IEEE Xplore, p. 816-820, 2008.
Park, M. et al, Automatic cell segmentation in microscopic color images using ellipse fitting and watershed, IEEE, p. 69-74, 2010.
Xiong, W. et al, Learning Cell Geometry Models for Search Image Simulation: An Unbiased Approach, Proceedings of 2010 IEEE 17th International Conference on Image Processing, p. 1897-1900, 2010.
Kong, H. et al, Partitioning Histopathological Images: An Integrated Framework for Supervised Color-Texture Segmentation and Cell Splitting, IEEE Transactions on Medical Imagin, vol. 20, No. 9, p. 1661-1677, 2011.
Xiao, Y. et al, Symmetry-based Presentation for Stem-Cell Image Segmentation, IEEE, p. 196-201, 2011.
Bergeest J. et al., Fast Globally Optimal Segmentation of Cells in Fluorescence Microscopy Images, MICCAI 2011, Part 1, LNCS 6891, p. 645-652, 2011.
Ali, S. et al, Adaptive Energy Selective Active Contour with Shape Priorts for Nuclear Segmentation and Gleason Grading of Prostate Cancer, MICCAI 2011, Part I, LNCS 6891, p. 661-669, 2011.
Keuper, M. et al, Hierarchical Markov Random Fields for Mast Cell Segmentation in Electron Microscopic Recordings, IEEE International Symposium on Biomedical Imaging (ISBI): 973-978, 2011.
Cheng, L. et al, Discriminative Segmentation of Microscopic Cellular Images, Medical Image Computing and Computer Assisted Intervention (MICCAI): 637-644, 2011.
U.S. Appl. No. 13/657,255, filed Oct. 22, 2012 (unpublished).
U.S. Appl. No. 13/666,343, filed Nov. 1, 2012 (unpublished).
Lezoray, et al. Cooperation of Color Pixel Classification Schemes and Color Watershed: A Study for Microscopic Images, Jul. 2002, IEEE Transactions on Image Processing, vol. 11, No. 7, pp. 783-789.
Lin, et al. A Hybrid 3D Watershed Algorithm Incorporating Gradient Cues and Object Models for Automatic Segmentation of Nuclei in Confocal Image Stacks, Feb. 2003, Wiley-Liss, Inc. Cytometry Part A 56A:23-36.
Cheng, et al., Segmetation of Clustered Nuclei with Shape Markers and Marking Function, Mar. 2009, IEEE Transactions on Biomedical Engineering, vol. 56, No. 3, pp. 741-748.
Adiga, et al. "High-throughput analysis of multispectral images of breast cancer tissue" IEEE Transactions on Image Processing, Aug. 2006; vol. 15 (8); pp. 2259-2268.
Chi-Man, et al. "A Region-Based Image Segmentation by Watershed Partition and DCT Energy Compaction", 2001 Eighth International Conference on Computer Graphics, Imaging Visualization (CGIV), in Singapore, Aug. 17-19, 2011; pp. 131-135.
Dalal, et al. "Histograms of oriented gradients for human detection", Proc of the IEEE Computer Society Conference on Computer Vision and Pattern Recognition, CVPR 2005.
Haris, et al. "Watershed-Based Image Segmentation with Fast Region Merging", Proceedings, 1998 International Conference on Image Processing, vol. 3, pp. 338-342, Location Chicago, IL, USA, Oct. 4-7, 1998.
Haris, et al. "Hybrid Image Segmentation using Watersheds and Fast Region Merging", IEEE Transactions on Image Processing, vol. 7, Issue 12, pp. 1684-1699, Dec. 1998.
Hodge, et al. "A survey of outlier detection methodologies", Artificial Intelligence Review, vol. 22, Jan. 2004; pp. 1-43.
Liu, et al. "Exploiting local structure for tracking plant cells in noisy images", Proceedings of the 16yh IEEE International Conference on Image Processing, ICIP 2009, pp. 1745-1748.
McCullogh, et al. "3D segmentation of whole cells and cell nuclei in tissue using dynamic programming", 4th IEEE International Symposium on Biomedical Imaging: Fram Nano to Macro, Apr. 2007, pp. 276-279.
Mori, et al., "Efficient shape matching using shape contexts", IEEE Transactions on Pattern Analysis and Machine Intelligence, Nov. 2005, vol. 27 (11) pp. 1832-1837.
Moussavi, et al. "3D Segmentation of cell boundaries form whole cell cryogenic electron tomography", Journal of Structural Biology, vol. 170 (1), Apr. 2010, pp. 134-145.
Padfield, et al. "Spatio-temporal cell segmentation and tracking for automated screening", 5th IEEE International Symposium on Biomedical Imaging: from Nano to Macro, May 2008, p. 376-379.
Pan, et al. Heterogeneous conditional random field: Realizing joint detection and segmentation of cell regions in microscopic images, mages, CVPR 2010, pp. 2940-2947.
Shah, Automatic cell segmentation using a shape-classification model in immunohistochemically stained cytological images, IEICE Trans. Inf. Syst., Jul. 2008, E91-D; pp. 1955-1962.
Vincent, et al., "Watersheds in digital spaces: An efficient algorithm based on immersion simulations", IEEE Trans Pattern Anal. Machine Intell. Jun. 1991; vol. 13, pp. 583-598.
Wu, et al., "A bottom-up and top-down model for cell segmentation using multispectral data", Proceedings of the 2010 IEEE International conference on Biomedical Imaging: from Nano to Macro, 2010. pp. 592-595.
Yang Mingqiang, et al. "A survey of shape feature extraction techniques". Pattern Recognition, 43:90, 2008.
Yin, et al. "Cell segmentation in microscopy imagery using a bag of local Bayesian classifiers", the IEEE International Symposium on Biomedical Imaging (ISBI), Apr. 2010.
Adiga, P.S. et al. An efficient method based on watershed and rule-based merging for segmentation of 3-D histo-pathological images. Pattern Recognition, 2001 vol. 34(7): pp. 1449-1458.
Ancin, H. et al. "An improved watershed algorithm for counting objects in noisy, anisotropic 3-D biological images" In Proceedings of ICIP 1995, vol. 3, Washington, DC, USA. IEEE Computer Society.
Wahlby, C. et al. "Sequential immunofluorescence staining and image analysis for detection of large numbers of antigens in individual cell nuclei" Cytometry, 2002 vol. 47:pp. 32-51.
Frangi, et al. "Multiscale vessel enhancement filtering" In Colchester, A. and Delp, S., editors, Proc. First Medical Image Computing and Computer Assisted Intervention, 1998 vol. 1496, pp. 130-137, Cambridge, MA. Springer Verlag.
Lindblad, et al. "Image analysis for automatic segmentation of cytoplasms and classification of rac1 activation" 2004, Cytometry A, vol. 57(1):pp. 22-33.
Mouroutis, et al. "Robust cell nuclei segmentation using statistical modeling" 1998 Bioimaging, vol. 6: pp. 79-91.
Parvin, E et al., "Biosig: An imaging bioinformatics system for phenotypic analysis" IEEE Transactions on Systems, Man and Cybernetics, Oct. 2003 Part B, vol. 33 No. 5 pp. 814-824.
Sato, et al. "3-D multi-scale line filter for segmentation and visualization of curvilinear structures in medical images" Medical Image Analysis, 1998, vol. 2 No. 2 pp. 143-168.
Soillle, "Morphological Image Analysis" Springer-Verlag, Berlin Heidelberg GmbH, 2nd edition 2004, pp. 267-292.
Zhu, et al. "Untangling cycles for contour grouping" Computer Vision, 2007. ICCV 2007. IEEE 11th International Conference, pp. 1-8.
Wang, et al. "Novel cell segmentation and online SVM for cell cycle phase identification in automated microscopy" Bioinformatcs, vol. 24 No. 1, 2008, pp. 94-101.
PCT Search Report and Written Opinion issued for PCT Application No. PCT/SE2013/051225 dated Apr. 16, 2014.

(56) References Cited

OTHER PUBLICATIONS

PCT Search Report and Written Opinion issued for PCT Application No. PCT/EP2013/065386 dated Sep. 4, 2013.
PCT Search Report and Written Opinion issued for PCT Application No. PCT/US2014/034471 dated Sep. 29, 2014.
Athelogou, Maria et al. "Cognition Network Technology: A Novel Multimodal Image Analysis Technique for Automatic Identification and Quantification of Biological Image Contents", Apr. 1, 2007, Springer-Verlag Berlin Heidelberg, pp. 407-422.
Wahlby, C, et al. "Algorithms of Cytoplasm Segmentation of Fluorescence Labelled Cells" Analytical Cellular Pathology, Elsevier Science, Amsterdam, NL, vol. 24, No. 2/03, Jan. 1, 2002, pp. 101-111.
Johnson, Brian, et al. "Unsupervised image segmentation evaluation and refinement using a multi-scale approach", ISPRS Journal of Photogrammetry and Remote Sensing, Amsterdam, NL, Elsevier, Feb. 10, 2011, vol. 66, No. 4, pp. 473-483.
Wang, Jianzhong et al. "Segmentation of 3-D MRI Brain Images Using Information Propagation", Medical Imaging and Augmented Reality Lecture notes in Computer Science, Jan. 1, 2006, Springer, Berlin, DE, pp. 348-355.
Santamaria-Pang, et al. "Cell segmentation and classification via unsupervised shape ranking", 2013 IEEE 10th International Symposium on Biomedical Imaging, Apr. 1, 2013, pp. 406-409.
Marcuzzo, M, et al. "Automated *Arabidopsis* plant root cell segmentation based on SVM Classification and region merging", Computers in Biology and Medicine, Sep. 1, 2009, New York, NY, US, vol. 39, No. 9, pp. 785-793.
Orozco-Monteagudo, M, et al. "A hybrid Approach for Pap-Smear Cell Nucleus Extraction", Pattern Recognition, Jun. 29, 2011, Springer Berlin Heidelberg, vol. 6718, pp. 174-183.
MacCormick, et al. "A probabilistic contour discriminant for object localization", In ICCV 1998, pp. 390-395.
Non-Final Rejection for U.S. Appl. No. 13/666,343 dated Jul. 21, 2014.
Aldon et al., "A new shape segmentation approach for active vision systems in Computer Vision and Pattern Recognition", Proceedings CVPR '91., IEEE Computer Society Conference, pp. 708-709, Jun. 1991.
Atiq et al., "Vehicle detection and shape recognition using optical sensors: A review. In Machine Learning and Computing", (ICMLC), 2010 Second International Conference, pp. 223-227, Feb. 2010.
Baatz et al., "Multiresolution segmentation: an optimization approach for high quality multi-scale image segmentation", Journal of Photogrammetry and Remote Sensing, 58(3-4):1223, 2000.
Bamford, P. "Empirical comparison of cell segmentation algorithms using an annotated dataset" In Image Processing, 2003. ICIP 2003. Proceedings. 2003 International Conference, vol. 2, pp. II-1073-II-1076 vol. 3, Sep. 2003.
Bamford, "Automating Cell Segmentation Evaluation with Annotated Examples", The University of Queensland, 2003.
Barash et al., "Multiplexed analysis of proteins in tissue using multispectral fluorescence imaging", Medical Imaging, IEEE Transactions on, vol. 29 No. 8 pp. 1457-1462, Aug. 2010.
Belongie et al., "Shape matching and object recognition using shape contexts". IEEE Trans. Pattern Anal. Mach. Intell., vol. 24, pp. 509-522, Apr. 2002.
Can et al., "A unified segmentation method for detecting subcellular compartments in immunofluorescently labeled tissue images" In: Microscopic Image Analysis with Applications in Biology. 2009.
Chang et al., "LIBSVM: A library for support vector machines. ACM Transactions on Intelligent Systems and Technology 2" (2011) 27:1-27:27 Software available at website www.csie.ntu.edu.tw/~cjlin/libsvm/.
Cheng et al., "Microscopic cell detection based on multiple cell image segmentations and fusion algorithms", In Biomedical Engineering and Informatics, 2009. BMEI '09. 2nd International Conference, pp. 1-7, Oct. 2009.
Zhu-Jacquot, "Graph cuts segmentation with geometric shape priors for medical images", In Image Analysis and Interpretation, 2008. SSIAI 2008. IEEE Southwest Symposium, pp. 109-112, Mar. 2008.

Conrad et al., "Automated Microscopy for High-Content RNAi Screening", JCB—Journal of Cell Biology,vol. 188, Issue 4 , pp. 453-461, Feb. 2010.
El Adawy et al., "A fast algorithm for segmentation of microscopic cell images", In Information Communications Technology, 2006. ICICT '06. ITI 4th International Conference, p. 1, Dec. 2006.
Fenistein et al., "A Fast, Fully Automated Cell Segmentation Algorithm for High-Throughput and High-Content Screening", Cytometry Part A the journal of the International Society for Analytical Cytology, vol. 73, Issue 10, pp. 958-964, Oct. 2008.
Fish, "Analysis for Breast Cancer", Bioview Ltd., Product catalogue 6 pages printed Apr. 2, 2012.
Guocheng et al., "Shape filling rate for silhouette representation and recognition", In Pattern Recognition (ICPR), 2010 20th International Conference, pp. 507-510, Aug. 2010.
Held et al., "Using Multimodal Information for the Segmentation of Fluorescent Micrographs with Application to Virology and Microbiology", 33rd Annual International Conference of the IEEE Engineering in Medicine and Biology Society, EMBC, pp. 6487-6490, Aug. 30, 2011-Sep. 3, 2011,Location: Boston, MA.
Helen et al., "Segmentation of pulmonary parenchyma in CT lung images based on 2D Otsu optimized by PSO", In Emerging Trends in Electrical and Computer Technology (ICETECT), 2011 International Conference, pp. 536-541, Mar. 2011.
Ibanez et al., "The ITK Software Guide" version 2.4 SBN 1-930934-15-7, http://www.itk.org/ItkSoftwareGuide.pdf Second Edition Nov. 2005.
Zacharia et al., "3-D spot modeling for automatic segmentation of cDNA microarray images" NanoBioscience, IEEE Transactions, vol. 9, No. 3, pp. 181-192, Sep. 2010.
Yasmin et al., "Robust segmentation algorithm using LOG edge detector for effective border detection of noisy skin lesions" In Computer, Communication and Electrical Technology (ICCCET), 2011 International Conference, pp. 60-65, Mar. 2011.
Kumar et al., "Personal recognition using hand shape and texture" Image Processing, IEEE Transactions, vol. 15, No. 8, pp. 2454-2461, Aug. 2006.
Lee et al., "A fast and robust approach for automated segmentation of breast cancer nuclei" In In Proceedings of the IASTED International Conference on Computer Graphics and Imaging, pp. 42-47. ACTA Press, 1999.
Liao et al., "Composite sketch shape recognition based on dagsvm and decision tree" In Machine Learning and Cybernetics, 2006 International Conference, pp. 3254-3259, Aug. 2006.
Xiao-Jing et al., "A new algorithm for watershed segmentation of cells in marrow" In Engineering in Medicine and Biology Society, 2005. IEEE-EMBS 2005. 27th Annual International Conference, pp. 6456-6459, Sep. 2005.
Martinez et al., "Bubble segmentation based on shape from shading for in-situ microscopy" In Electrical Communications and Computers (CONIELECOMP), 2011 21st International Conference, pp. 1-4, Mar. 2011.
Wollman et al., "High throughput microscopy: from raw images to discoveries" Journal of Cell Science 120, vol. 21, pp. 3715-3722, Nov. 2007.
Mukherjee et al., "Segmentation of circular and rectangular shapes in an image using helmholtz principle" In Computer Vision, Graphics Image Processing, 2008. ICVGIP '08. Sixth Indian Conference, pp. 657-664, Dec. 2008.
Na et al., "The segmentation of overlapping milk somatic cells based on improved watershed algorithm" In Artificial Intelligence and Computational Intelligence, 2009. AICI 2009. International Conference, vol. 3, pp. 563-566, Nov. 2009.
Oh et al., "Bayesian shape recognition using principle component analysis and modified chain codes" Control, Automation and Systems, 2008. ICCAS 2008 International Conference, pp. 2138-2141, Oct. 2008.
Orikawa et al., "Cell segmentation from phase-contrast images using hybrid watershed and region growing algorithm for genomic drug discovery". In SICE Annual Conference 2010, Proceedings of, pp. 84-88, Aug. 2010.

(56) References Cited

OTHER PUBLICATIONS

Wenhua et al., "White blood cell segmentation and extraction based on histogram multi-threshold and lifting wavelet" In Electric Technology and Civil Engineering (ICETCE), 2011 International Conference on, pp. 4730-4732, Apr. 2011.

Ray et al., "Data acceptance for automated leukocyte tracking through segmentation of spatiotemporal images", Biomedical Engineering, IEEE Transactions on, vol. 52 No. 10, pp. 1702-1712, Oct. 2005.

Reniers et al., "Skeleton-based hierarchical shape segmentation", In Shape Modeling and Applications, 2007. SMI '07. IEEE International Conference, pp. 179-188, Jun. 2007.

Siddiqi et al., "Area and length minimizing flows for shape segmentation". IEEE Transactions on Image Processing, vol. 7 No. 3, Mar. 1998 pp. 433-443.

Suresh et al., "Analysis of segmentation and tracking algorithms for time lapse microscopic progenitor cell images", In Signal and Image Processing (ICSIP), 2010 International Conference, pp. 453-456, Dec. 2010.

Toennies et al., "A weight-adaptive dynamic model for shape segmentation", In Image Processing, 2005. ICIP 2005. IEEE International Conference, vol. 2, pp. II-814-II-817, Sep. 2005.

Valmianski et al., "Automatic Identification of Fluorescently Labeled Brain Cells for Rapid Functional Imaging", Journal of Neurophysiology—Innovative Methodology, 25 pages, Jun. 2010.

Wang et al., "A modified watersheds image segmentation algorithm for blood cell", In Communications, Circuits and Systems Proceedings, 2006 International Conference, vol. 1, pp. 450-454, Jun. 2006.

Wang et al., "Detection and segmentation of generic shapes based on affine modeling of energy in eigenspace", Image Processing, IEEE Transactions, vol. 10 No. 11 pp. 1621-1629, Nov. 2001.

Wang et al., "Conformal geometry and its applications on 3d shape matching, recognition, and stitching", Pattern Analysis and Machine Intelligence, IEEE Transactions, vol. 29 No. 7 pp. 1209-1220, Jul. 2007.

\* cited by examiner

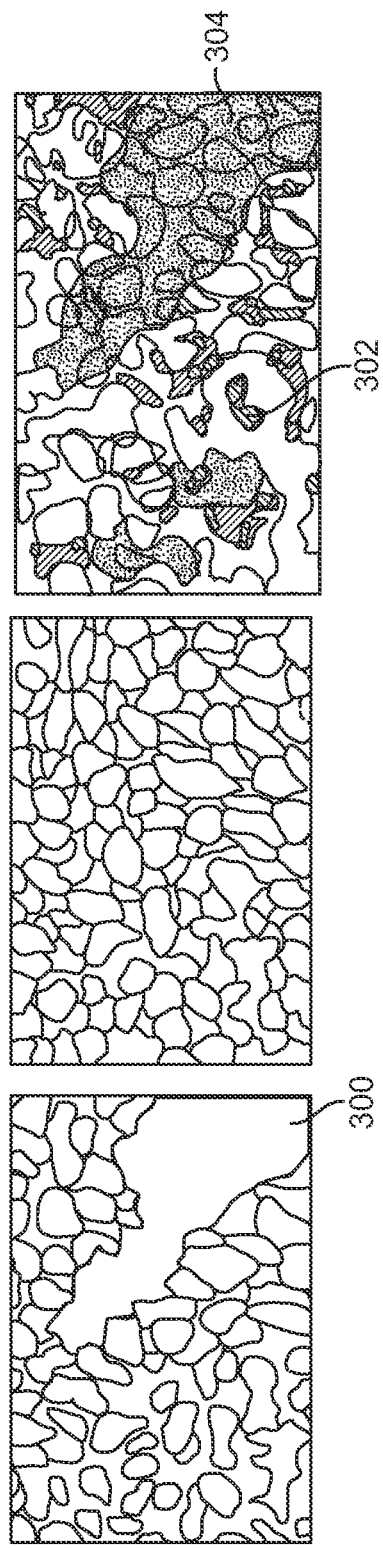

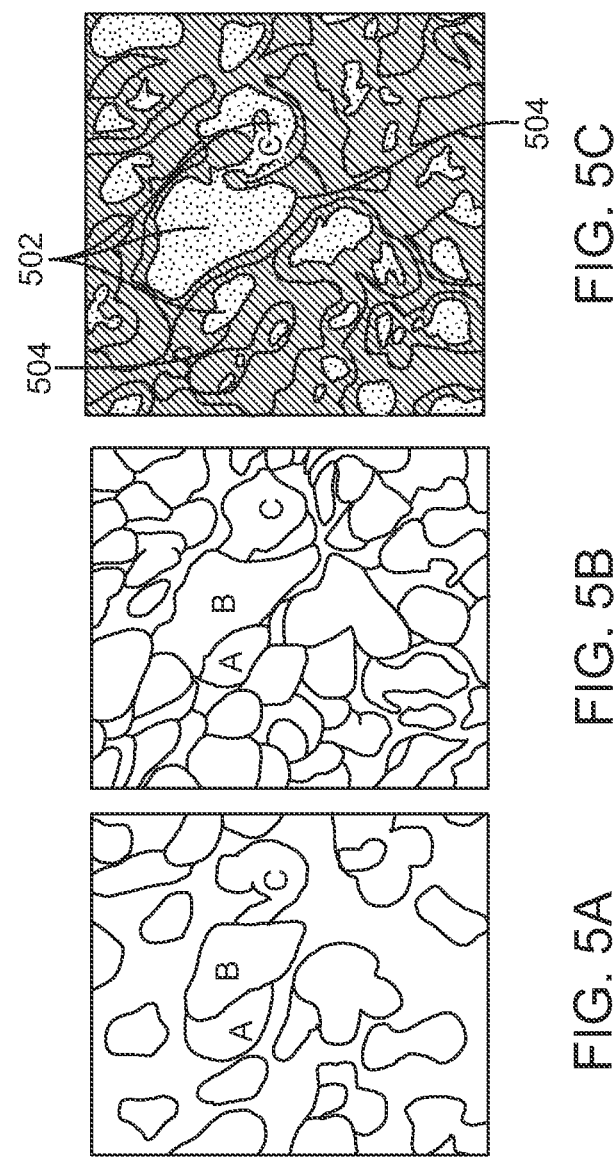

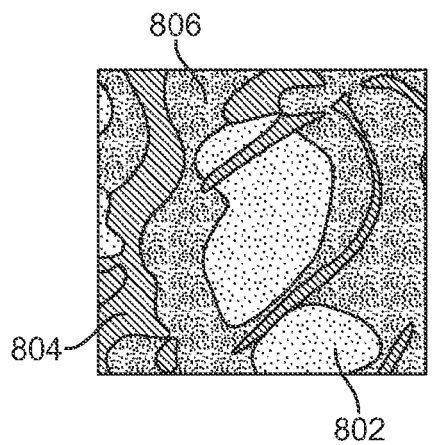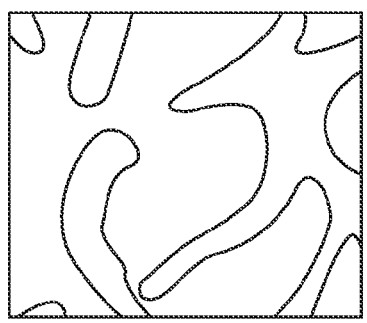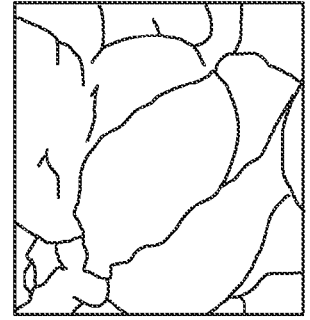
FIG. 8A   FIG. 8B   FIG. 8C
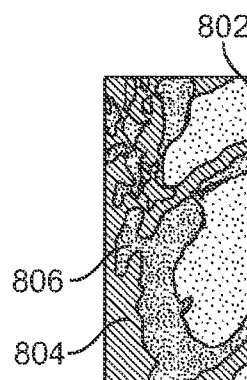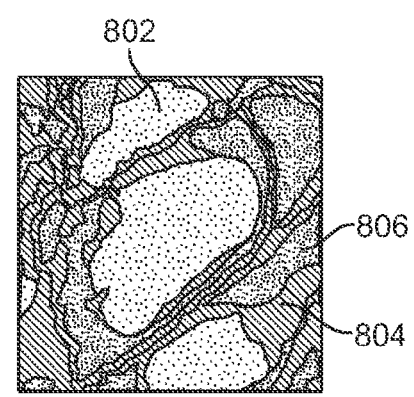
FIG. 8D   FIG. 8E Nuclei Detected Nuclei Membrane Detected Membrane Cytoplasm Detected Cytoplasm Detected Cell Compartments Detected Nuclei Original Image

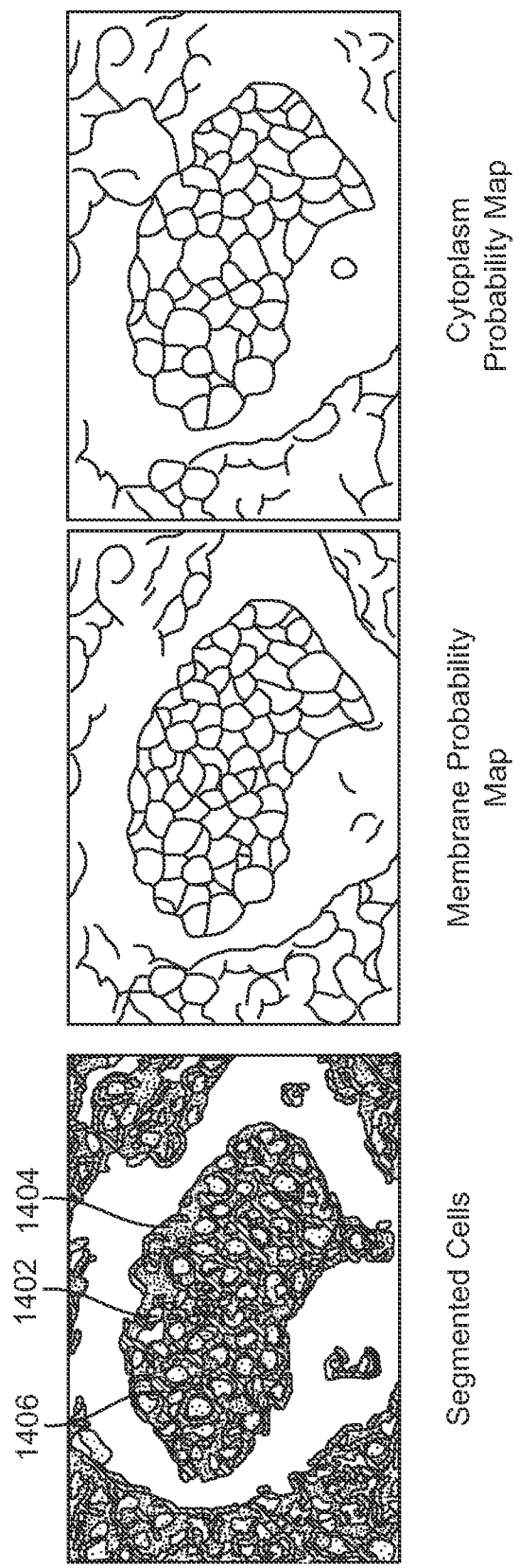

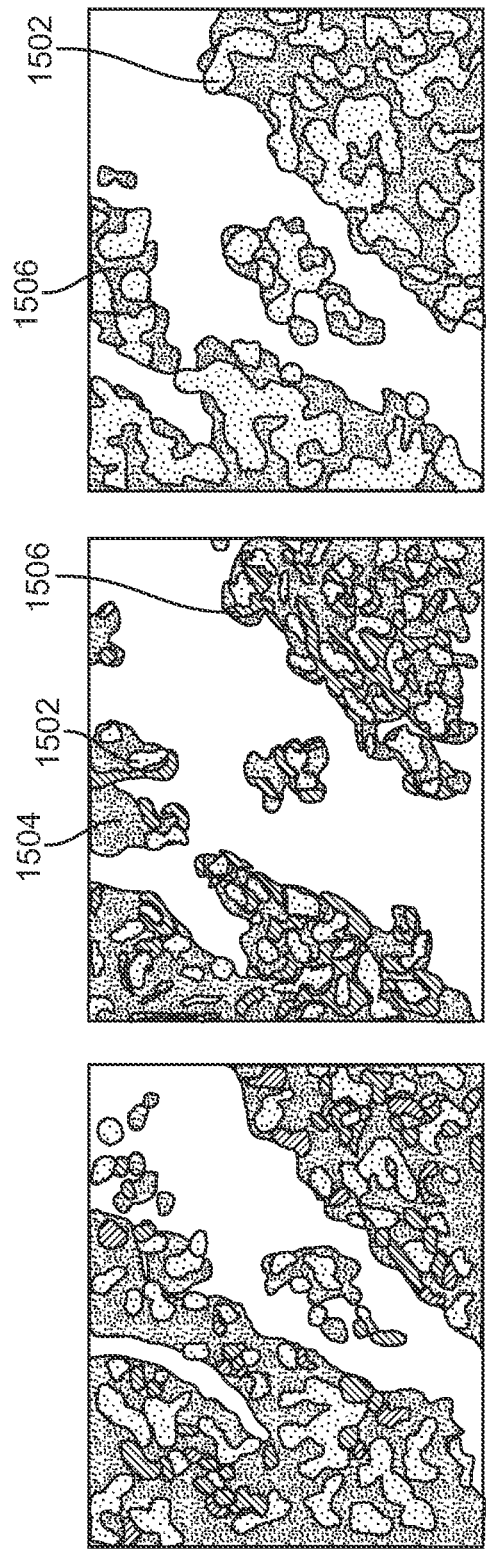
FIG. 15I Defines Segmentation
FIG. 15H GRC Segmentation
FIG. 15G Raw Data

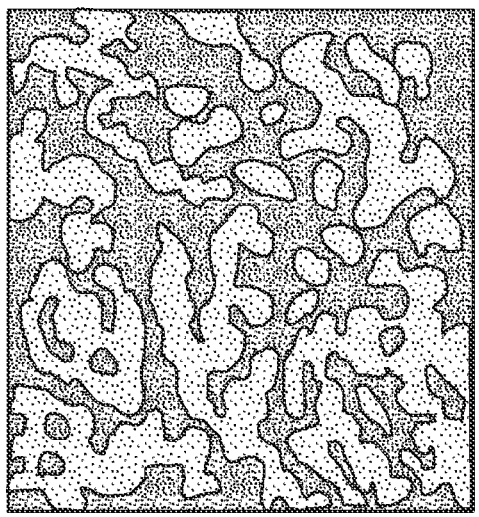
FIG. 16I Defines Segmentation
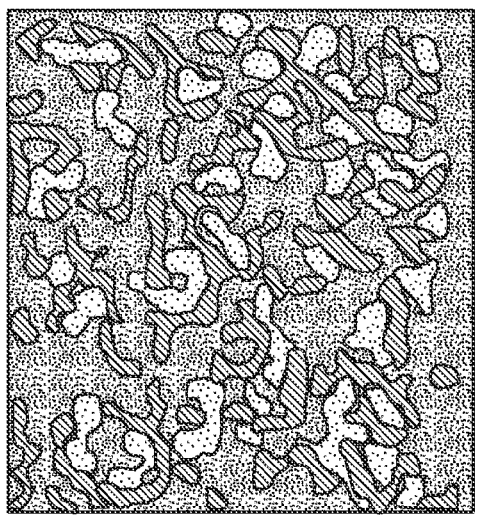
FIG. 16H GRC Segmentation
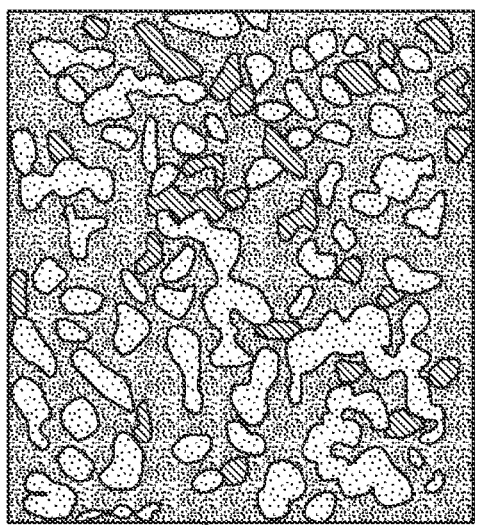
FIG. 16G Raw Data Nuclei Channel Morphological Channels Segmentation

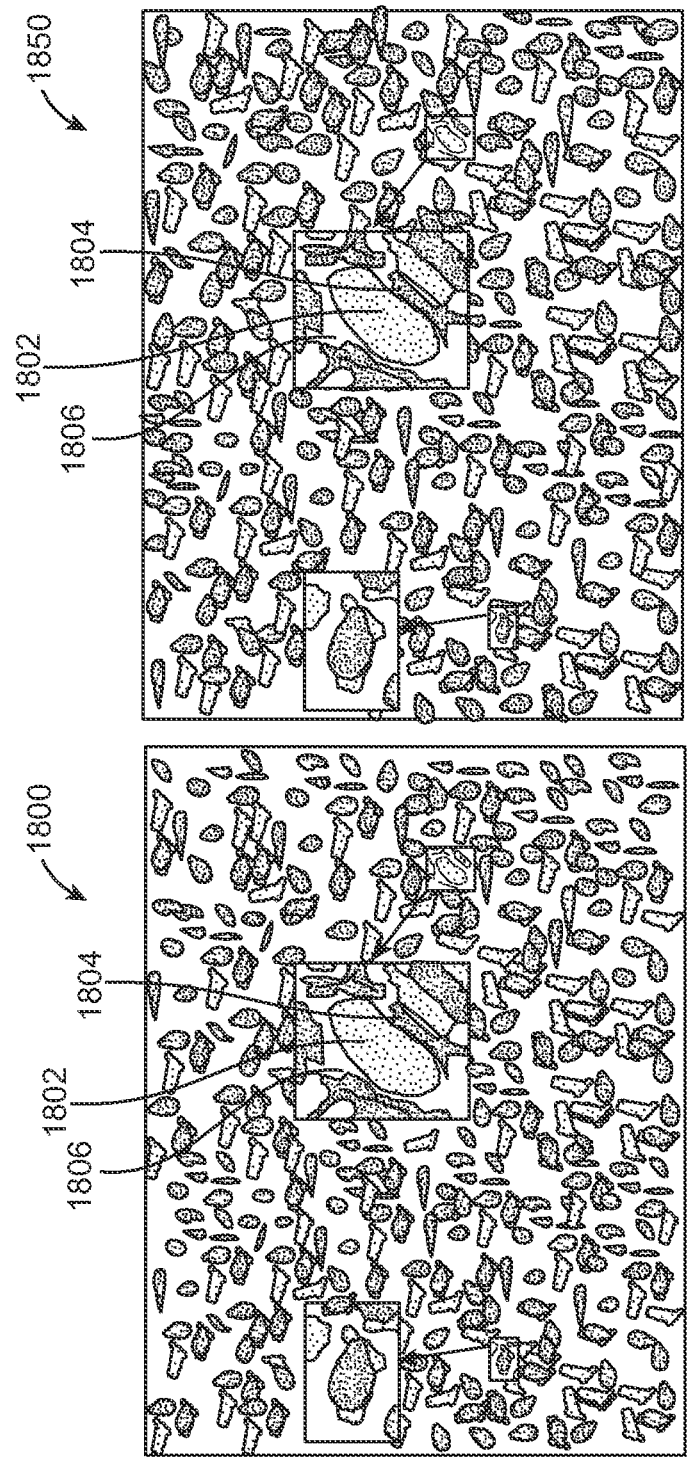
FIG. 18A pGSK quantification
FIG. 18B Keratin quantification

SYSTEM AND METHOD FOR MULTIPLEXED BIOMARKER QUANTITATION USING SINGLE CELL SEGMENTATION ON SEQUENTIALLY STAINED TISSUE

FIELD

Embodiments relate generally to analysis of digital images, and more particularly, to analysis of digital images of biological tissue samples.

BACKGROUND

In general, the term segmentation refers to the identification of boundaries of biological units, such as cells, within a digital image. These boundaries separate each individual unit from others. The digital image may be obtained using a microscope. Weak or data driven segmentation algorithms may be used to define cell boundaries. For example, a watershed transform is one image processing technique that has been used for segmenting images of cells. With the watershed transform, a digital image may be modeled as a three-dimensional topological surface, where values of pixels (e.g., brightness or grey level) in the image represent geographical heights.

Due to variations in the histology of different tissue types, however, weak segmentation algorithms may not produce an accurate segmentation without significant adaptation and optimization to specific tissue type applications. For example, a weak segmentation algorithm may cause the image to be over-segmented (e.g., what appears as a single cell may actually be only a portion of a cell) or under-segmented (e.g., what appears as a single cell may actually be several different cells in combination). Furthermore, the image may not be properly segmented with a weak segmentation algorithm, in part, because a suitable segmentation parameter for one region of the image may not work well in other regions of the same image. Therefore, a weak segmentation algorithm may not be robust enough for segmentation of large numbers of cells having many morphological variations.

There has been previous work performed regarding cell analysis (see, e.g., Lindblad et al., *Image analysis for automatic segmentation of cytoplasms and classification of rac1 activation*, Cytometry A, 57(1):22-33 (2004); Wahlby et al., *Sequential immunofluorescence staining and image analysis for detection of large numbers of antigens in individual cell nuclei*, Cytometry, 47:32-51 (2002); Parvin et al., *Biosig: An imaging bioinformatics system for phenotypic analysis*, IEEE Transactions on Systems, Man and Cybernetics, Part B, 33:814-824 (2003); Mouroutis et al., *Robust cell nuclei segmentation using statistical modeling*, Bioimaging, Vol, 6:79-91 1998 (1998); Lin et al., *A hybrid 3d watershed algorithm incorporating gradient cues and object models for automatic segmentation of nuclei in confocal image stacks*; Cytometry Part A, 56A(1):23-36 (2003); McCullough et al., *3D segmentation of whole cells and cell nuclei in tissue using dynamic programming*, Biomedical Imaging: From Nano to Macro, ISBI 2007, 4th IEEE International Symposium on, pages 276-279 (2007); Wang et al., *Novel cell segmentation and online SVM for cell cycle phase identification in automated microscopy*, Bioinformatcs, Vol. 24, No. 1, pages 94-101 (2008)).

For example, Wang et al. proposed a method for cell segmentation and cycle estimation using an individual channel. In general, such method is based on machine learning methods using support vector machines from segmented images.

In Lindblad et al., a method for cell segmentation was generally proposed based on nuclei and cytoplasm markers, where each cell has one nucleus. Nuclei segmentation was performed by selecting a global threshold value, and using the watershed algorithm. Once the nuclei regions were segmented, they were used as seed regions to segment the cytoplasm by applying the watershed algorithm.

A method for quantification of sequential immunofluorescence staining was proposed in Wahlby et al. This method is generally based on the quantification of the immunofluorescence staining only in the nuclei, where nuclei segmentation is a semi-automatic process, which involves human intervention. In Mouroutis et al., a statistical method for nuclei segmentation was proposed. This method typically includes defining a likelihood function, and to separate touching nuclei as a mixture of Gaussians distributions.

In general, different methods have been proposed for cell segmentation in 3D in confocal imaging, and mainly these methods focus in segmenting the cell nuclei. For example, in Lin et al., a method for 3D nuclei segmentation from confocal stacks was proposed, and the approach generally includes three steps. The first step is a pre-processing step, where noise is removed and segmented using global thresholding. The second step typically separates those nuclei which are touching by applying a 3D watershed algorithm using a gradient-weighted distance transform. The third step is a post-processing step, which is typically used as surface breaker. A method for 3D segmentation of whole cells was reported by McCullough et al. This method is designed to segment the nuclei objects in 3D, where cell boundaries are detected. However, there is no segmentation of 3D cells as a unit.

Thus, an interest exists for improved systems and methods for analyzing digital images of biological tissue samples. These and other inefficiencies and opportunities for improvement are addressed and/or overcome by the systems, assemblies and methods of the present disclosure.

SUMMARY

The present disclosure provides advantageous systems and methods for the analysis of digital images. In exemplary embodiments, the present disclosure provides for improved systems and methods for the analysis of digital images of biological tissue samples.

The present disclosure provides for a computer-implemented method for performing hierarchical image segmentation analysis of sub-cellular units in biological tissue, the method including accessing image data corresponding to multi-channel multiplexed image of biological tissue sequentially fluorescent stained to manifest expression levels of a plurality of morphological biomarkers in the biological tissue, performing multi-channel image segmentation analysis on the image data based on the biomarker expression levels to identify locations and configurations of one or more cells in the biological tissue, performing multi-channel image segmentation analysis on the image data based on the biomarker expression levels to identify locations and configurations of one or more sub-cellular morphological units within the one or more cells, rendering, on a visual display device, a hierarchical representation of the one or more cells and the one or more sub-cellular morphological units in the one or more cells.

The present disclosure provides for a computer system for performing multi-channel hierarchical image segmentation analysis of sub-cellular units in biological tissue, the computer including a visual display device, a processing device, and a storage device. The processing device is configured to access multi-channel image data corresponding to a multiplexed image of biological tissue sequentially fluorescent stained to manifest expression levels of a plurality of morphological biomarkers in the biological tissue, perform multi-channel image segmentation analysis on the image data based on the biomarker expression levels to identify locations and configurations of one or more cells in the biological tissue, and perform image segmentation analysis on the image data based on the biomarker expression levels to identify locations and configurations of one or more sub-cellular morphological units within the one or more cells. The storage device is configured to store the locations and configurations of the one or more sub-cellular morphological units within the one or more cells.

The present disclosure provides for a one or more computer-readable media having encoded thereon one or more computer-executable instructions for performing a method for performing multi-channel hierarchical image segmentation analysis of sub-cellular units in biological tissue, the method including accessing image data corresponding to a multiplexed image of biological tissue sequentially fluorescent stained to manifest expression levels of a plurality of morphological biomarkers in the biological tissue, performing multi-channel image segmentation analysis on the image data based on the biomarker expression levels to identify locations and configurations of one or more cells in the biological tissue, performing multi-channel image segmentation analysis on the image data based on the biomarker expression levels to identify locations and configurations of one or more sub-cellular morphological units within the one or more cells, and rendering, on a visual display device, a hierarchical representation of the one or more cells and the one or more sub-cellular morphological units in the one or more cells.

In some embodiments, expression levels of a biomarker in the one or more cellular morphological units at cell level can be automatically determined and expression levels of a biomarker in the one or more sub-cellular morphological units at the level of the sub-cellular morphological units can be automatically determined.

In some embodiments, a plurality of biological tissue regions can be automatically grouped based on the expression levels of the biomarker in the sub-cellular morphological units.

In some embodiments, an analysis to determine a relationship between expression levels of a biomarker in the one or more sub-cellular morphological units and the configurations of the one or more sub-cellular morphological units can be performed.

In some embodiments, the one or more sub-cellular morphological units include one or more nuclei, one or more cytoplasms, and/or one or more membranes.

In some embodiments, the one or more sub-cellular morphological units include a membrane or a cytoplasm, and the image segmentation analysis can identifies the membrane or cytoplasm by using a probability map to generate a ring-like structure modeling the membrane or the cytoplasm.

In some embodiments, representations of expression levels of a biomarker can be rendered on a visual display device in an overlaid manner on the representations of the one or more cells and the one or more sub-cellular morphological units in the one or more cells.

In some embodiments, a measure of expression levels of a biomarker can be determined. The measure can be specific to at least one of the one or more sub-cellular morphological units in the one or more cells. The measure of the expression levels of the biomarker can be a mean of the expression levels.

In some embodiments, the locations and configurations of the one or more sub-cellular morphological units can be determined by imposing topological constraints within the cells.

In some embodiments, the plurality of morphological biomarkers include a plurality of biomarkers representative of a single type of sub-cellular morphological unit.

In some embodiments, image segmentation analysis is performed on the image data based on the biomarker expression levels and biomarker morphology to identify at least one tissue-based region of interest and a hierarchical representation of the one or more cells, the one or more sub-cellular morphological units in the one or more cells, and the at least one tissue-based region of interest can be rendered on a visual display device.

In some embodiments, the one or more sub-cellular morphological units include at least one of cell membranes of the one or more cells, cytoplasms of the one or more cells, and nuclei of the one or more cells and a hierarchical representation of the one or more cells, the at least one tissue-based region of interest, the at least one of the cell membranes of the one or more cells, the cytoplasms of the one or more cells, and the nuclei of the one or more cells can be rendered on a visual display device.

In some embodiments, the at least one tissue-based region of interest includes a collection of stromal cells or a collection of epithelial cells.

In some embodiments, shapes of the one or more cells based on the image segmentation analysis identifying the locations and the configurations of the one or more cells can be determined and the one or more cells, sub-cellular units based on the shapes of the one or more cells, or sub-cellular units can be ranked. Each ranking can indicate a probability or similarity that cell boundaries, or sub-cellular units of a corresponding cell or sub-cellular unit are correctly identified by the image segmentation analysis.

In some embodiments, a pixel of the image data is associated with a single type of sub-cellular morphological unit is provided in the hierarchical representation. In some embodiments, a pixel of the image data with one or more types of sub-cellular morphological unit is provided in the hierarchical representation. In some embodiments, the pixel of the image data with a first probability that the pixel corresponds to the first type of sub-cellular morphological unit and a second probability that the pixel corresponds to the second type of sub-cellular morphological unit is provided in the hierarchical representation. In some embodiments, the pixel of the image data with a first membership value that the pixel corresponds to the first type of sub-cellular morphological unit and a second membership value that the pixel corresponds to the second type of sub-cellular morphological unit in the hierarchical representation.

In some embodiments, one or more segmentation-quality metrics can be determined for the one or more cells.

In some embodiments, the one or more segmentation-quality metrics for the one or more cells can be rendered on a visual display device in an overlaid manner over the rendering of the one or more cells.

In some embodiments, rendering of the multi-channel hierarchical representation of the one or more cells includes only rendering a subset of cells among the one or more cells having segmentation-quality metrics that satisfy one or more predefined segmentation quality criteria.

In some embodiments, multi-channel image segmentation analysis can be performed on the image data based on the biomarker expression levels to identify locations and configurations of one or more tissue-types in the biological tissue.

Any combination or permutation of embodiments is envisioned. Additional advantageous features, functions and applications of the disclosed systems, assemblies and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various steps, features and combinations of steps/features described below and illustrated in the figures can be arranged and organized differently to result in embodiments which are still within the spirit and scope of the present disclosure. To assist those of ordinary skill in the art in making and using the disclosed systems, assemblies and methods, reference is made to the appended figures, wherein:

FIGS. 3A-C depict images of image flattening according to exemplary embodiments of the present disclosure;

FIGS. 5A-C depict images of individual nuclei, membrane and nuclei and membrane

FIGS. 8A-E depict images of hierarchical joint segmentation at the sub-cellular level, according to exemplary embodiments of the present disclosure;

FIGS. 14A-F depict images of the segmentation results of individual cell analysis in the epithelium;

FIGS. 15A-I depict a comparison of Xenograft images and segmentation result images according to exemplary embodiments of the present disclosure;

FIGS. 16A-I depict another comparison of Xenograft images and segmentation result images according to exemplary embodiments of the present disclosure;

FIGS. 18A-B depict images of biomarker quantifications according to exemplary embodiments of the present disclosure.

DETAILED DESCRIPTION

Figure 1:
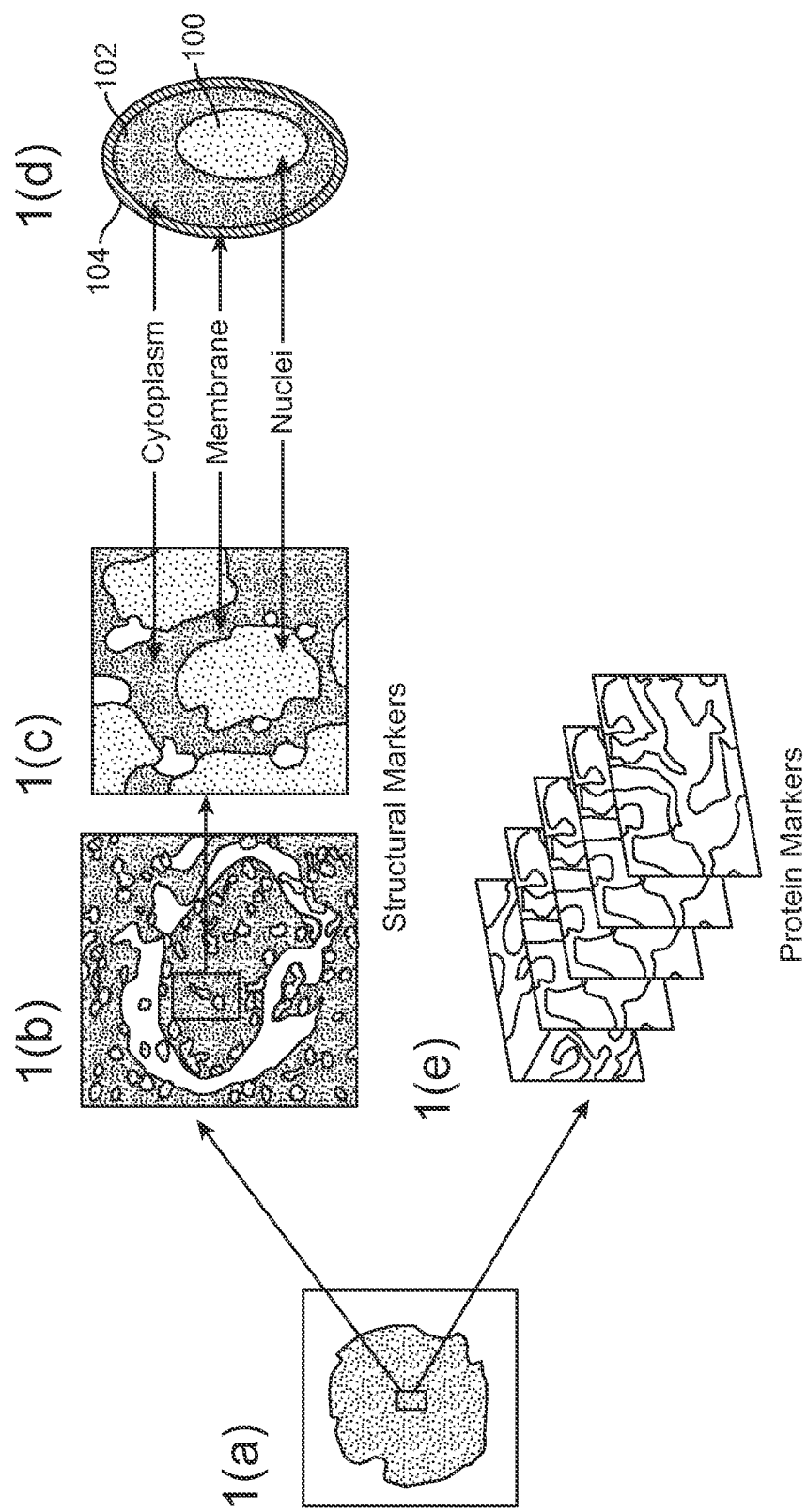
FIGS. 1A-E depict images/schematics of multiplexing images and joint segmentation, according to exemplary embodiments of the present disclosure.

The present disclosure provides advantageous systems and methods for the analysis of digital images. More particularly, the present disclosure provides for improved systems and methods for the analysis of digital images of biological tissue samples.

Previous approaches do not account for tissue analysis, grouping and quantification of tissue sections in terms of sub-cellular compartments (e.g., nuclei, membrane and cytoplasm). Such existing approaches focus in nuclei segmentation using information derived from only one channel. In addition, morphological biomarkers that provide structural descriptors of the tissue architecture at the sub-cellular level have not been used to group, quantify and correlate individual and cell populations to discover complex biomarker networks within cell populations.

Exemplary embodiments of the present disclosure provide for: i) segmenting, ii) grouping, and iii) quantifying molecular protein profiles of individual cells in terms of sub-cellular compartments (e.g., nuclei, membrane, and cytoplasm). Exemplary embodiments advantageously perform tissue segmentation at the sub-cellular level to facilitate analyzing, grouping and quantifying protein expression profiles of tissue in tissue sections globally and/or locally. Performing local-global tissue analysis and protein quantification advantageously enables, for example, correlation of spatial and molecular configuration of cells with molecular information of different types of cancer.

In exemplary embodiments, joint segmentation of cellular entities and their compartments can be performed based on registered sequentially stained fluorescent images. Exemplary embodiments of the present disclosure can take advantage of contextual information expressed in the sequentially stained images to segment and quantify tissue both globally and locally in terms of sub-cellular compartments e.g., nucleus, membrane and cytoplasm. Exemplary embodiments can: (i) impose topological constraints in a hierarchical structure to correctly segment sub-cellular compartments, (ii) group individual cells according to specific criteria, and/or (iii) quantify groups of cells based on corresponding biomarker protein expression at the sub-cellular level.

The following definitions of the present disclosure mathematically formalize an "individual cell" as an entity in terms of:

Compartments: Each individual cell has a substantially semicircular/elliptical shape and it may be composed by none, any or all of the three regions: nuclei, membrane and cytoplasm, and where each region is a sub-cellular compartment.

Hierarchical relationship: For each sub-cellular compartment, the following hierarchy relationship holds: i) the nuclei is at the center of the cell, and is surrounded by the cytoplasm, and ii) the membrane is the located at the border of the cell and surrounds the cytoplasm.

As used herein, the term "morphological unit" refers to different cellular or sub-cellular structures, including, for example, nuclei, cytoplasm, and membrane.

As discussed further below, the exemplary systems/methods of the present disclosure include a hierarchical top-down approach to cell segmentation. In one exemplary embodiment of the top-down approach, first, individual single cell boundaries are segmented, and then individual sub-cellular compartments are imposed with topological constraints within the cell, so that hierarchical relationships are valid.

In exemplary embodiments, multi-channel segmentation processes can be performed using multiplexed images of biological tissue. In general, a multiplexed image typically consists of "N" number of channels of the same tissue section, where each channel provides a detailed and unique protein expression profile of the tissue of interest, thereby describing, for example, both the morphology and molecular composition of cancer tumors. Thus, local tissue quantification at both the molecular and morphological level is possible by applying image analysis methods to multiplexed imaging in tissue micro-arrays.

Some of the problems of individual cell analysis of tissue in multiplexed imaging can include the following challenges associated with individual cell segmentation, grouping and quantification as follows:

Individual cell segmentation challenges can include: i) finding the association rule that maps every pixel in the multiplexing image to each individual cell, ii) finding the association rule of each pixel within the sub-cellular compartments corresponding to each individual cell (e.g., the association rule of each pixel and the nuclei, membrane and cytoplasm for a given cell), iii) finding a membership function that maps every pixel within the sub-cellular compartments corresponding to each individual cell (e.g., the membership function of each pixel and the nuclei, membrane and cytoplasm for a given cell)

One challenge of cell grouping is association among individual cells according to a given rule. For example, grouping rules can be according to: i) spatial relations (e.g., cells that belong to the epithelium region, or tissue organs), ii) morphological relationships among cells (e.g., cells that are circular versus cells that resemble ellipses), and/or iii) image segmentation quality, where those that are based on inclusion-exclusion rules (e.g., cells for which the membrane is surrounding the complete cell border).

One challenge of individual cell quantification is the measure of the protein expression locally and globally in terms of the sub-cellular compartments. That is, for every pixel, a given value of the protein expression is assigned according to the contextual information of the sub-cellular compartments.

Other challenges towards individual cell analysis are the following:

Variation in cell morphology. Individual cells are three-dimensional objects, and once samples are obtained as serial fluorescent tissue sections, cells are then described by the two-dimensional projection of the cell. Depending on the serial section, individual cells are not regular circular objects, but rather can have elliptical shapes.

Absence of nuclei. Individual cells may not have a nucleus well defined or present at all, given that some tissue samples have a thickness of about 5 mm. In this regard, cells that are not cut correctly by the middle, the two dimensional image may not intersect the cell-nuclei, and still the region can define an individual cell. This is due to orientation of the cut with respect to the cell.

Noise. Image noise can affect the quality of the image at the global and/or local level. In addition, the non-uniform distribution of the fluorescent dyes and the effects of auto-fluorescence of the tissue may produce regions which contain high levels of artifacts.

It is noted that one purpose of tissue multiplexing imaging is not to capture the entire bandwidth of the signal (similar to satellite imaging) but rather, to capture substantially all available contextual information with the means of molecular fluorescent probes that label specific cellular compartments or tissue organs (blood vessels, etc.).

An example of contextual information is the intracellular spatial relations of sub-cellular compartments, where the nucleus is the cell's center, the membrane is at the cell's border, and the cytoplasm is between the membrane and the nuclei. Also, it should be noted that information of additional channels can be integrated. For example, by integrating protein markers that bind to specific tissue types such as blood vessels, this can provide unique and relevant information to group individual cells for tissue architecture analysis.

Multiplexed Imaging

Given "Z" number of distinct channels, the channels can be grouped as structural and morphological protein markers, so that there are "P" and "M" number of protein and morphological channels, respectively. The original number of "Z" channels can then be expressed as: Z=P+M. The compound image T can be defined as the vector-value function with Z number of channels or features as:

$$T(x,y)=[I_1(x,y),\ldots,I_N(x,y)],(x,y)\in\Omega.$$

Then T can be written in terms of the individual channels as:

$$T=[T_{Structural};T_{Protein}]=[I_1,\ldots,I_m;I_1,\ldots,I_n].$$

The morphological channels $T_{Structural}$ consist of three or more different channels that provide structural information of the tissue in terms of: nuclei: $T_{Structural}^{Nuc}$, membrane: $T_{Structural}^{Memb}$, and cytoplasm: $T_{Structural}^{Cyt}$ and they can be written as the vector value function:

$$T_{Structural} = [T_{Structural}^{Nuclei}; T_{Structural}^{Membrane}; T_{Structural}^{Cytoplasm}]$$
$$= [I_1^N, \ldots, I_p^N; I_1^M, \ldots, I_q^M; I_1^C, \ldots I_r^C],$$

where p+q+r=m

Similarly, the vector value function $T_{Protein}$ can be written in terms of the protein channels: $T_{Protein}=[I_1,\ldots,I_n]$.

Multi-Channel Segmentation

In exemplary embodiments, $g_N, g_M, g_C$ are different vector-value functions which map the corresponding nuclei, membrane and cytoplasm channels into a single channel. For example, $g_N(T_{Structural}^{Nuclei})$, $g_M(T_{Structural}^{Membrane})$, $g_C(T_{Structural}^{Cytoplasm})$ are scalar value images and each mapping $g_i$, i={N, M, C} is defined as a flattening function and its purpose is to enhance the morphological structures from different channels.

Next, a compartmental channel image $T_{Compartments}$ is formed, capturing the most relevant structural information within the image, and it can be written as:

$$T_{Compartments}=[g_N(T_{Structural}^{Nuclei}), g_M(T_{Structural}^{Membrane}), g_C(T_{Structural}^{Cytoplasm})]$$

Note that, $g_M$ enhances the overall membrane from different membrane markers such as: NaKATP, pCad, and Keratin.

Similarly $g_C$ enhances the cytoplasm and $g_N$ the nuclei. Then $T_{Compartments}$ is a three-channel image containing the optimal structural representation of the tissue architecture.

FIGS. 1A-E depict images/schematics of multiplexing images and joint segmentation, according to exemplary embodiments of the present disclosure. FIG. 1A depicts a tissue core with different degrees of cancer. In FIGS. 1B-D, the images corresponding to $T_{Compartments}$ (derived from the structural markers) and the corresponding $f_{Segmentation}$ function which maps the corresponding pixels into nuclei, membrane and cytoplasm are shown. In FIG. 1E, schematics corresponding to different protein markers $T_{Protein}$ for the same tissue spot is shown.

As such, FIG. 1 presents images of a tissue sample with the corresponding optimal structural $T_{Compartments}$ and protein markers $T_{Protein}$. Optimal structural markers $T_{Compartments}$ are shown in different colors represented by cross-hatching in FIG. 1 (e.g., orange/red, green and blue), and represent membrane structures 104, cytoplasm structures 102 and nuclei structures 100, respectively. Protein markers $T_{Protein}$ are shown in FIG. 1E.

Individual cell segmentation and quantification is thereby formulated as a multi-channel segmentation problem, where each individual cell is associated with three classes: 1) membrane, 2) cytoplasm, and 3) nuclei (as depicted in FIG. 1D).

Given the set of cell labels: Cell_Labels:={ln=nuclei, lm=membrane, lc=cytoplasm, lb=background}, the cell segmentation problem can be formulated as finding the function $f_{segmentation}$ which is defined as:

$$f_{Segmentation}(T_{Compartments}(x,y))=[ncell,ln,lm,lc,lb], \text{ and } ln+lm+lc+lb=1,$$

where ncell is the specific cell number, and $li \in [0,1]$, $i=\{n,m,c,b\}$ are the affinity values for the pixel (x, y).

It is noted that this formulation allows assigning each pixel $(x, y) \in I_C$ to the unique cell and the specific compartments. One advantageous case of the previous formulation is binary segmentation. In addition, information contained in the different channels $T_{Compartments}$ is complementary with respect to each other, and it is used by the segmentation function $f_{Segmentation}(T_{Compartments})$. An example of such used is specific cell morphological configuration.

Multi-Channel Quantification

Quantifying of the protein channels $T_{Protein}$ given segmentation function $f_{seg}$ relates to measure the strength of the protein expression not only at the pixel level, but in a sub-cellular level across the identified cells. It is defined by the function $f_{Quantification}$ as follows:

$$f_{Quantification}(f_{Segmentation}(T_{Compartments}),T_{Protein})= [ncell,q_{nuc},q_{memb},q_{cyt}],$$

where $f_{Quantification}$ is a function that maps the values from the protein image $T_{Protein}$ at the specific cell, and at the sub-cellular compartments defined by $f_{Segmentation}$. An example of functions for $f_{Quantification}$ can be the mean, and standard deviation among others. In addition, $f_{Quantification}$ can represent probability distributions of the protein with respect to a given compartment.

EXAMPLES

The present disclosure will be further described with respect to the following examples; however, the scope of the disclosure is not limited thereby.

Materials

Images were acquired with an Olympus Microscope from: i) a representative dataset of tissue samples with different degrees of prostate cancer, and ii) Xenograft images. Typical Biomarkers of interest include, without limitation: DAPI, CFP3, S6, pS6, DAPI, CFP4, Glu1, pCad, CFP5, pCREB, Ki67, pS6235, CFP6, AF_pCREB, AF_Ki67, CFP7, FOXO3a, NaKATP, CFP8, pAkt, Keratin, CFP9, and pGSK3beta.

Structural makers include: $T_{Structural}$={DAPI, S6, pCad, NaKATP, Keratin}, while the rest are protein makers $T_{Protein}$.

Method Overview

Figure 2:
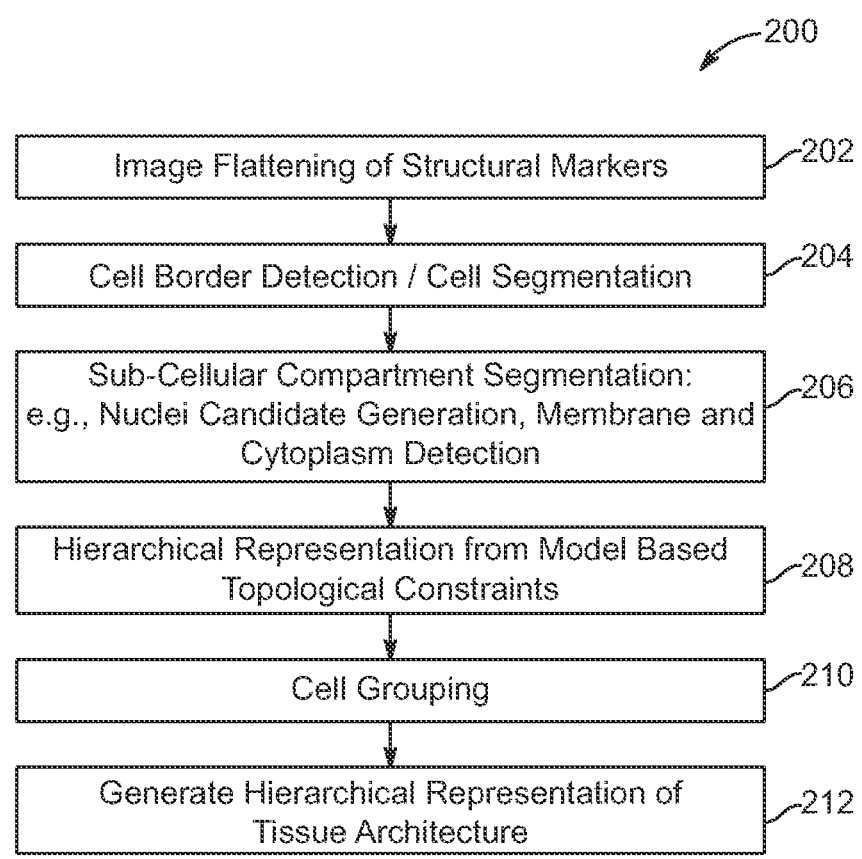
FIG. 2 is a flow diagram illustrating a segmentation process in accordance with exemplary embodiments of the present disclosure.

As noted above, the following definitions of the present disclosure mathematically formalize an "individual cell" as an entity in terms of: (i) compartments: each individual cell has a substantially semicircular/elliptical shape and is composed by three regions: nuclei, membrane and cytoplasm, and where each region is a sub-cellular compartment; and (ii) hierarchical relationship: for each sub-cellular compartment, the following hierarchy relationship holds: a) the nuclei is at the center of the cell, and is surrounded by the cytoplasm, and b) the membrane is the located at the border of the cell and surrounds the cytoplasm. The systems/methods of the present disclosure include a hierarchical top-down process (FIG. 2). In the top-down process, first, individual single cell boundaries are segmented, and then individual sub-cellular compartments are imposed with topological constraints within the cell, so that hierarchical relationships are valid.

FIG. 2 is a flow diagram illustrating a top-down segmentation process 200 in accordance with exemplary embodiments of the present disclosure. In exemplary embodiments, multiplexed images of biological tissue can be retrieved from memory (e.g., non-transitory computer-readable media). The digital image may be obtained, for example, using a microscope and a camera. The target biological units in the digital image may include, but are not necessarily limited to, cells and/or sub-cellular compartments. Exemplary target cells may include, for example, i) epithelial cells and/or stromal cells, or ii) necrotic cells. The term biological unit, as used herein, refers to discrete biological structures and portions, components or combinations of biological structures in the digital image.

In step 202, a multiplexed digital image of biological tissue is enhanced to integrate information from different protein channels. In step 204, individual cell segmentation is performed to discriminate between individual cells. For example, exemplary embodiments can identify individual cell by detecting the border or boundary of the individual cells. In some embodiments, supervised or unsupervised shape ranking and/or support vector segmentation can be used to identify cell borders in the digital image. In some embodiments, tissue segmentation can be performed in the flattened image to discrimination between different tissue types before step 204. For example, tissue segmentation can be implemented to discriminate between, and classify cells as, epithelial cells, stromal cells, and/or necrotic cells.

In step 206, sub-cellular compartment segmentation is performed to discriminate between and classify different sub-cellular compartments. For example, exemplary embodiments can identify and classify sub-cellular compartments as nuclei, membrane, and/or cytoplasm.

In step 208, a hierarchical representation of the identified sub-cellular compartments is generated using a spatial order within the cell compartments. The hierarchical representation can include an expected location of the nuclei, cytoplasm, and membrane with respect to each other. In step 210 cells are grouped based on characteristics of the individual cells as determined based on the segmentation steps above. For example, cells can be grouped according to protein profile expression and/or according to spatial and/or morphological rules. With respect to the latter, the grouping of cells can be used to discriminate between, and classify cells as, epithelial cells, stromal cells, and/or necrotic cells. In step 212, a hierarchical representation of the tissue architecture is generated. The hierarchical representation can include images, graphics, and/or text to illustrate a hierarchy of the biological tissue in the digital image. The hierarchy relates to the relationships between the biological units in the image and can include levels, such as, a tissue level, cellular level, and/or a sub-cellular level. For example, in certain embodiments, a tree data structure can be generated, which can be rendered as in a graphical form, as described in more detail below.

Image Enhancement of Structural Markers

Image enhancement improves the imaging quality of a specific compartment by integrating information from different protein channels with respect to the same sub-cellular compartment so that important information from different channels enhances the overall image specific marker. In one embodiment, image flattening can be defined as a linear transformation, for which each channel in a composite image has a different mixing factor contributing to the overall enhanced image. The enhancement function for the membrane and cytoplasm markers can be expressed mathematically as:

$$g_M(T_{Structural}^{Membrane}) = \alpha_1 I_1^M + \alpha_2 I_2^M + \ldots + \alpha_p I_p^M,$$

$$\text{such that } \sum_i \alpha_i = 1,$$

$$g_C(T_{Structural}^{Cytoplasm}) = \beta_1 I_1^C + \beta_2 I_2^C + \ldots + \beta_q I_q^C,$$

$$\text{such that } \sum_i \beta_i = 1,$$

where $\alpha_i$, $\beta_i$ are the corresponding mixing factors. The overall energy of the system is preserved by constraining the sum of the corresponding mixing factors to one. Averaging is a particular case of image enhancement transformation.

FIGS. 3A-C depict examples where the transformed enhanced image captures the whole tissue morphology globally and locally. In this case, the structural markers correspond to membrane markers, where high protein content is localized in the cell membrane (e.g., these markers enhance the cell border). FIG. 3A depict Na/K ATPase 202. FIG. 3B depict P-cadherin 204. FIG. 3C depict a color image that is a composite of the two protein markers: Na/K ATPase 202 (as shown in FIGS. 3A and 3C) and P-cadherin 204 (as shown in FIGS. 3B and 3C).

Different image artifacts can be recovered by applying the enhanced image transformation. For example, FIG. 3A shows a region with an image artifact 300, and FIG. 3B presents the corresponding region with no artifacts after enhancement. FIG. 3C shows how these markers provide information needed to recover such artifacts.

As such, structural markers $T_{Structural}$ corresponding to Na/K ATPase 302 and P-cadherin 304 are shown in FIGS. 3A and 3B, respectively. A composite image from the corresponding protein markers is shown in FIG. 3C. It is noted that by combining different markers, cases where image artifacts may exist can be corrected (e.g., FIG. 3C).

Figures 4A, 4B:
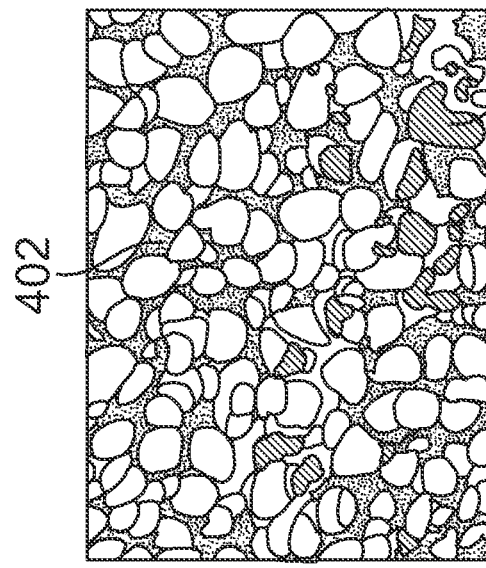
FIGS. 4A-B depict other images of image flattening.

FIG. 4A depicts a composite color image of two membrane protein markers: Na/K ATPase 404 (e.g., cross-hatching to represent pure red) and P-cadherin 402 (e.g., cross-hatching to represent pure green), respectively. FIG. 4B shows the corresponding transformed image $g_M(T_{Structural}^{Membrane})$ as the result of the enhancement process. The result of the image enhancement is an image that integrates the morphological information of both markers: Na/K ATPase 404 and P-cadherin 402. Here, the combination of both protein markers delineates the epithelial cell membranes.

Cell Border Detection (Cell Segmentation)

In one exemplary embodiment, cell segmentation can follow a top-down approach, where cells are first detected as a unit, and then, sub-cellular compartments are detected based on hierarchical constraints as discussed in more detail below. One challenge of segmenting each cell can be posed as detecting individual cell borders. The challenge in detecting cell borders is that there can be no clear and well defined boundary among cells, and cells must not overlap with each other. In the case where cells touch each other, there must exist a minimum distance of "one unit or pixel."

In one embodiment, individual cell borders can be detected based on the transformed enhanced image $g_M(T_{Structural}^{Membrane})$ described herein. Using the transformed enhanced image, regions that correspond to local maxima also correspond to the "optimal" separation of two cells, while regions that correspond to local minima, correspond to the nuclei region. To identify the regions, a variation of a watershed algorithm can be implemented, where regions of local minima are used as regions to delineate the cell borders by applying the watershed algorithm (see, e.g., Soille, *Morphological Image Analysis*, Springer-Verlag, Heidelberg, 2nd edition (2003)). Using this approach, regions of local maxima correspond to cell borders. Other examples of detecting individual cell borders are discussed in more detail in co-pending U.S. patent application Ser. Nos. 13/666,343 and 13/657,255, filed on Nov. 1, 2012, Oct. 22, 2012, respectively, the disclosure of which is incorporated by reference herein.

Nuclei Candidate Generation (Sub-Cellular Segmentation)

In the context of individual cell segmentation in terms of sub-cellular compartments, a candidate nucleus is generated from the DAPI channel itself, and then, to correctly separate corresponding nuclei, a novel method, which penalizes the cell border estimated from the membrane marker, is used.

FIGS. 5A-C depict examples of typical tissue where cells are touching each other. FIG. 5A depicts a DAPI channel of nuclei and membrane, FIG. 5B depicts an enhanced image of nuclei and membrane, and FIG. 5C depicts a composite image of nuclei 502 and membrane 504. FIG. 5A presents the case where cells are poorly differentiated from the DAPI channel. Note that three cells: A, B, and C overlap with respect to each other (e.g., nuclei corresponding to cells A and B are overlapping with each other, making the difference of cells A and B difficult—similarly for cells B and C). FIG. 5B shows the same region with respect to the membrane channel. Note that cell discrimination is more evident as compared with the DAPI channel. FIG. 5C shows a composite of both, nuclei 502 and membrane channels 504 using cross-hatching to representing blue and red, respectively.

In this step, two alternative methods for nuclei candidate generation are presented. The first method is based on detection of blob-like objects from a curvature metric constrained to a shape template, see Methods for segmenting objects in Images, International Application Number: PCT/SE2011/050407]. The second method is based on Wavelet Analysis (Padfield et al., *Spatiotemporal cell segmentation and tracking for automated screening*, Biomedical Imaging: From Nano to Macro, ISBI 2008, 5th IEEE International Symposium, 376-379 (2008)).

The wavelet analysis approach decomposes the images into different frequency channels, then de-noises the images in the wavelet coefficient space, and recombines relevant levels to yield segmented objects. Wavelets have several advantages for this application: they decompose the image in both the spatial and frequency domain enabling effective scale-space analysis, the calculation of wavelets across multiple scales is fast and computationally efficient, and the number of parameters can be limited or completely eliminated.

To de-noise the images and segment the objects, an algorithm is utilized based on the shift-invariant wavelet frames transformation of the image, as well as the filtering of non-salient wavelet coefficients. Wavelet frames are identical to the standard wavelet transform except that the decimation operation at each level is omitted. Prior research demonstrates that the wavelet frames transform is robust to local noise variations and discards low frequency objects in the background. To de-noise the images in the wavelet coefficient space, the signal term is approximated by thresholding the image stack with an Amplitude-scale-invariant Bayes Estimator (ABE) using Jeffreys' non-informative prior as an estimate of the significance of wavelet coefficients. In order to further reduce noise and enhance objects that extend across multiple resolutions, a correlation stack is computed, which is the multiplication of a subset of the de-noised wavelet coefficients corresponding to the selected scales.

Figure 6C:
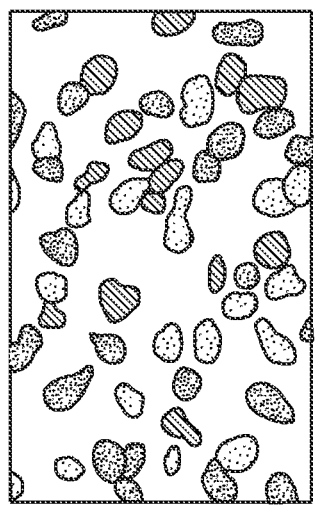
FIGS. 6A-C depict images of nuclei segmentation only from the nuclei channel.
Figure 6B:
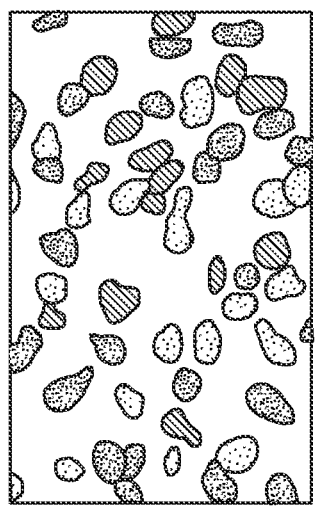
Figure 6A:
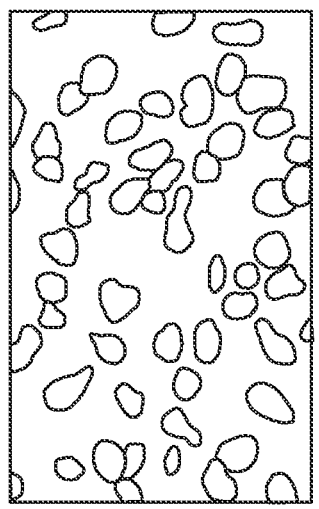

One of the advantages of the wavelet-based method for de-noising and segmentation is how it naturally represents objects at different scales. The selection of which scales to combine can be determined from the resolution of the images and the approximate expected object size. The subset of the channels used for the correlation stack are chosen to correspond with the scales at which the objects appear, thus ignoring scales containing only noise and those containing only low-frequency background information. The segmentation is then obtained as the extraction of connected regions in the correlation stack for coefficients greater than zero. Since the correlation stack emphasizes the frequencies corresponding to the objects, little post-processing is necessary to yield consistent filled shapes. This algorithm can detect objects even in the presence of relatively low contrast-to-noise and in the presence of slowly varying backgrounds (e.g., see FIG. 6B). FIGS. 6A-6C depict: (i) an original image (FIG. 6A), (ii) nuclei segmentation based on the wavelets based approach (FIG. 6B), and (iii) nuclei segmentation based on the shape-analysis based approach (FIG. 6C).

The shape analysis approach assumes that nuclei cells have smooth but irregular convex shape such as a deformed ellipsoid. The method generally operates in two main steps. First, a watershed algorithm is used to find the cell nuclei regions. Watershed uses seed points that correspond to local minimum, where each seed point is found by applying morphological operations. In the second step, regions are merged. Merging criteria is a function of the magnitude of the gradient, the distance transform and the perimeter ratio of two neighboring nuclei (see, e.g., FIG. 6C).

Membrane and Cytoplasm Detection (Ring Model Based Detection) (Sub-Cellular Segmentation)

Figure 7A:
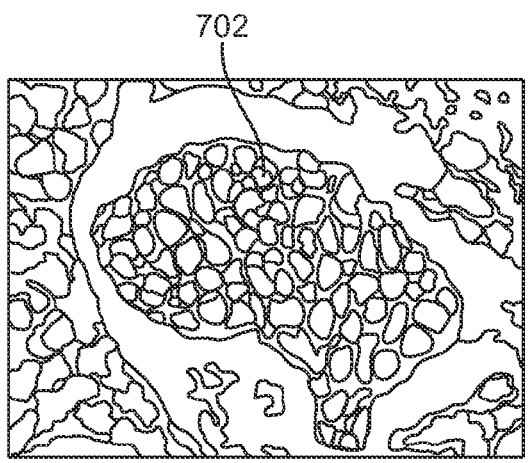
FIGS. 7A-B depict images of membrane detection according to exemplary embodiments of the present disclosure.
Figure 7B:
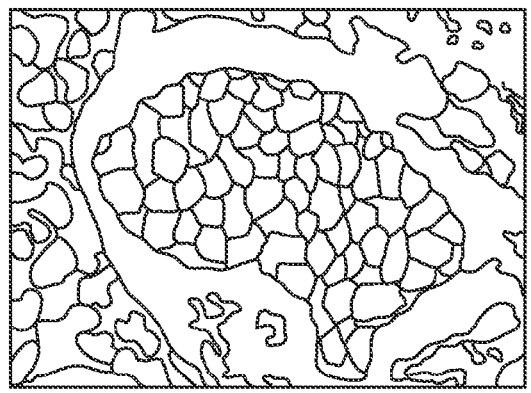

FIG. 7A depicts an image corresponding to the transformed structural marker $g_M(T_{Structural}^{Membrane})$. In FIG. 7A, it can be observed that the membrane 702 exhibits a tubular-like morphology, and regions corresponding to local maxima are in the substantial center or medial axis of the membrane 702, while regions corresponding to local minima are the center of each individual nuclei. In general, structural markers corresponding to the membrane and cytoplasm reach a maximum protein expression in the center of the membrane and cytoplasm respectively, while reaching a minimum protein expression in the stroma and nuclei regions, making them suitable to the local and global shape of the membrane and cytoplasm. In exemplary embodiments, the advantageous approaches of the present disclosure include proposing a shape model for the individual membrane and cytoplasm, where the shape model corresponds to the geometrical model of a two-dimensional image with variations in diameter. FIG. 7B shows an image depicting the probability map of the detected membrane 702.

One proposed approach of the present disclosure detects both membrane and cytoplasm with different thickness. In exemplary embodiments, this approach is model based and performs analysis at different scales. It is inspired in the geometrical model of a two-dimensional ring, where the scale factor corresponds to the radius of the ring, and the center of the two dimensional ring reaches values that are close to one, while the border of the ring reaches values close to zero.

Let $0 \leq \lambda_1(x, y) \leq \lambda_2(x, y)$ be the ordered eigenvalues of the Hessian matrix at a specific scale. A measure for ring-like structures can then be defined by constructing a probability map, where values with maxima probability are assigned to the medial axis of the two-dimensional ring as:

$$T(I_C) = \max_{r \in [r_{min}, r_{max}]} (g(\lambda_1^r, \lambda_2^r))$$

In the above equation, $r_{min}$, $r_{min}$ are the minimum and maximum radius of the two dimensional ring, and $\lambda_1^r, \lambda_2^r$ are the eigenvalues of the Hessian matrix at the scale r, and g: $\lambda_1^r \times \lambda_2^r \to [0,1]$ is the function subject to the following constraint:

$$\lim_{x \to \infty} g(x) = 1$$
$$\lim_{x \to 1} g(x) = 0,$$

where $$x = \left| \frac{\lambda_1}{\lambda_2} \right|,$$

that is, x is the ratio of the eigenvalues, and g penalizes when they are equal and assigns values of one when the ratio is large.

It is noted that to detect the ring having a variable radius, a multi-scale analysis is performed, thereby ensuring that the probability values are assigned with respect to the range of expected radius values. Then, the maximum probability across scales corresponds to the radius of the two-dimensional ring.

Hierarchical Representation from the Model Based Topological Constraints

Hierarchical representation of sub-cellular compartments assigns spatial order within the cell compartments as depicted in FIG. 1. The hierarchical model is constrained so that sub-cellular regions are competing with each other and have a predetermined precedence so that they maximize the probability of the specific localization.

As discussed in more detail below, FIG. 8A depicts an original multi-channel image, with the nuclei 802, cytoplasm 806 and membrane 804, which are represented using cross-hatching corresponding to the blue, green and red channel, respectively. FIG. 8B depicts the probability map that corresponds to the detected cytoplasm based on the ring-based model. FIG. 8C depicts the probability map that corresponds to the detected membrane based on the ring-based model. FIG. 8D depicts the hierarchical segmentation with a non-overlapping rule, and FIG. 8E depicts the hierarchical segmentation with an overlapping rule.

FIG. 8A depicts a composite image of three channels: nuclei 802 (blue), membrane 804 (red), and 806 cytoplasm (green). In this example it is evident that the structural markers overlap and this ambiguity can be modeled by the segmentation function $f_{seg}(I_C(x, y))$=[ncell, ln, lm, lc, lb], and assigning a label (or membership) value to the specific compartment.

FIG. 8B represents the probability map of the detected cytoplasm. It is noted that the probability values are maximum in the center of the membrane where there is a variable radius. Similarly, the probability map of the membrane is presented in FIG. 8C. It is noted that the membrane is localized towards the cell border, while the cytoplasm is localized closer to the nucleus. This information is incorporated in a cost function, which maximizes the probability of the hierarchical localization of the sub-cellular compartments.

The topological constraints that follow the detection of the compartments are as follows: the method can prioritize sub-cellular regions according to different hierarchical combinations of the sub-cellular compartments. Example of sub-cellular prioritization are the following: 1) membrane, versus the rest of the regions: membrane has more priority than cytoplasm and nuclei, and nuclei has more priority than cytoplasm, 2) membrane, versus the rest of the regions: membrane has more priority than cytoplasm and nuclei, and cytoplasm has more priority than nuclei.

FIG. 8D depicts the result of the hierarchical segmentation, where the red region corresponds to the detected membrane within the cell. The green region corresponds to the detected cytoplasm, and the detected nuclei is blue, while the background is in black. In this case, each pixel gets assigned a unique label: $l_i \in [0,1]$, $i=\{n,m,c,b\}$. FIG. 8E depicts the case where pixels belong to different compartments, according to whether they overlap or not. The an intersection of the detected membrane and cytoplasm is shown in FIG. 8E, and in this case, the weights are assigned evenly.

Cell Grouping

In exemplary embodiments, cell grouping includes identifying individual cells that follow a specific pattern or criteria. In general, there are two main criteria for cell association. The first is grouping according to different protein profile expressions (e.g., the clustering of individual cells according to their specific protein profiles). The second is grouping according to spatial and morphological rules (e.g., cells that belong to the epithelium and stroma).

Hierarchical Graph Based Representation

Figure 9:
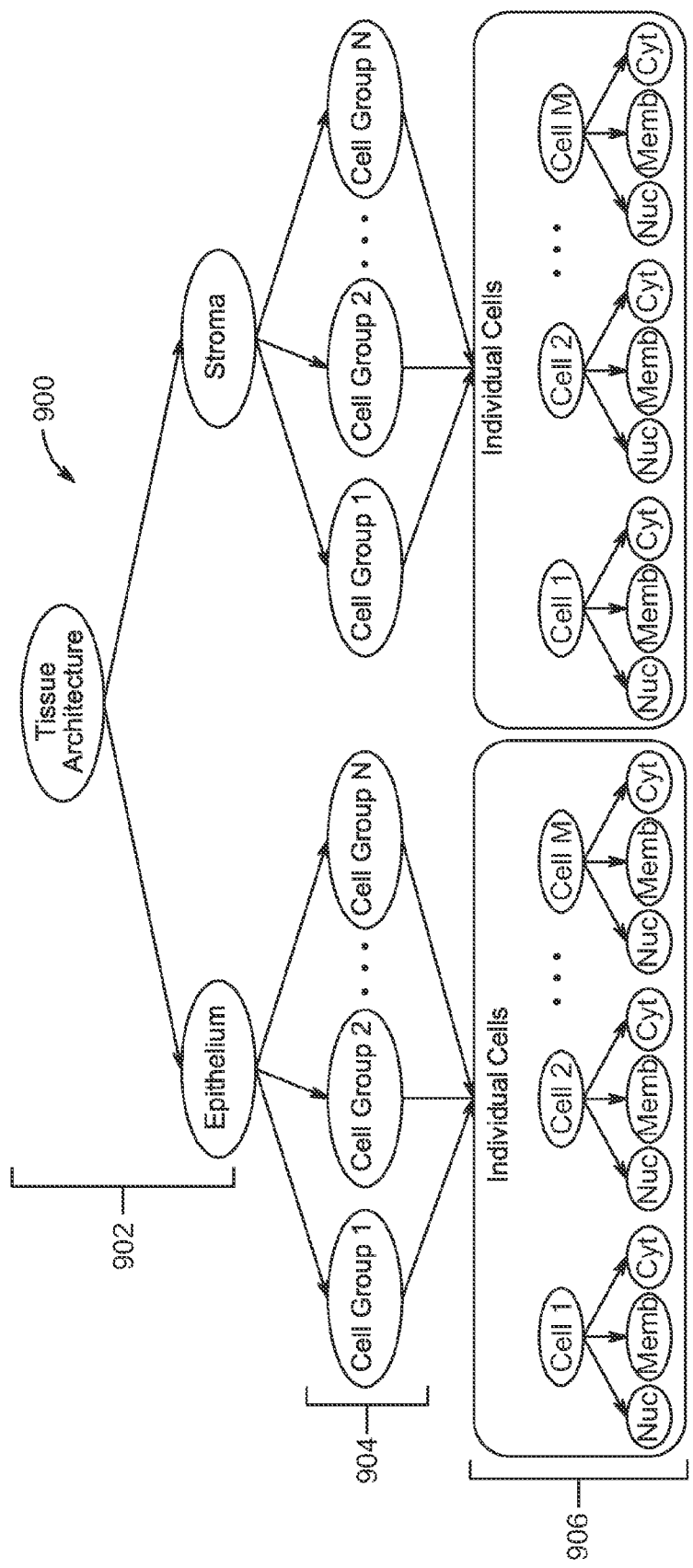
FIG. 9 depicts the representation and abstraction of an exemplary tissue architecture at the sub-cellular level as a tree data structure.

FIG. 9 depicts the representation and abstraction of an exemplary tissue architecture 900 at the sub-cellular level as a tree data structure. The first level 902 of abstraction is the segmentation of the tissue in terms of epithelium and stroma. It is noted that epithelium cells typically are associated with different degrees of cancer. The second level 904 of abstraction is the identification of different groups or sub-populations of individual cells (e.g., cells that belong to different glands, cells that belong to red blood cells, among other criteria, etc.). In general, for each group or sub-population, there are spatial, morphological and/or protein expression rules. The third level 906 of abstraction is the representation of the tissue at the sub-cellular level in which each individual cell is expressed in terms of sub-cellular compartments (e.g., individual cell segmentation in terms of nuclei, membrane and cytoplasm).

Figure 10:
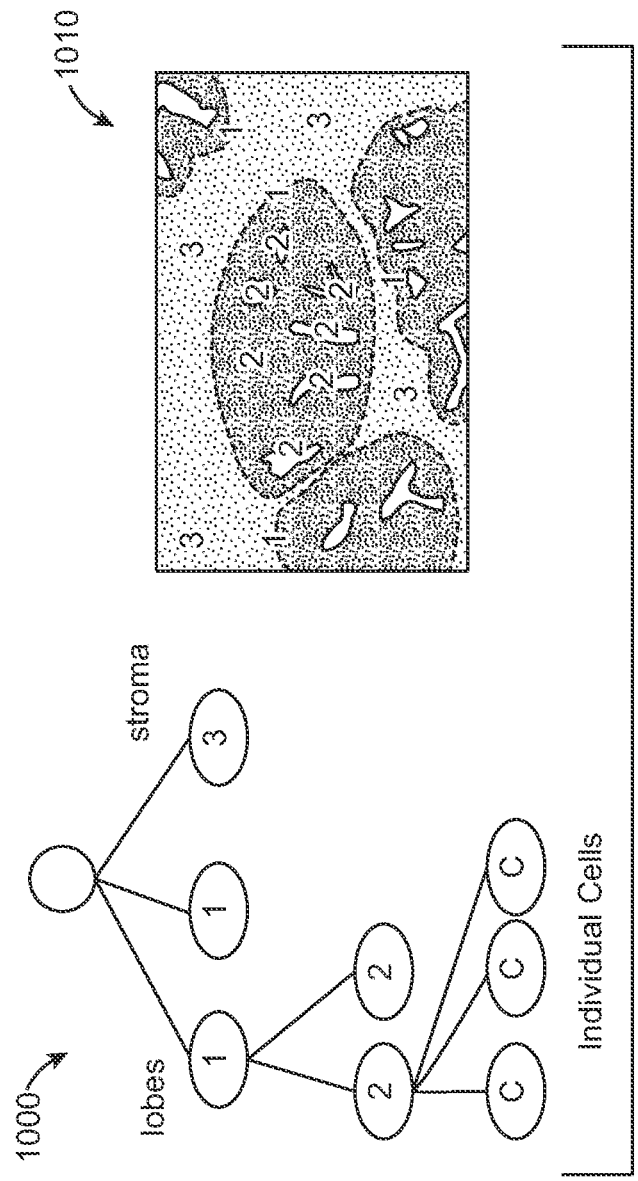
FIG. 10 is an example of the proposed tissue representation depicted in FIG. 9.

FIG. 10 is an example of the proposed tissue representation depicted in FIG. 9. In FIG. 10, the tissue architecture 1000 is composed of lobes (e.g., epithelium cells) and stroma regions. The association rule is defined by the cells that are in the end secretory parts of the main prostatic glands.

FIG. 10 depicts the lobules 1 of the main prostatic glands 1010, the end secretory parts 2 of the main prostatic glands, and the stroma 3 composed from smooth muscle cells and/or connective tissue. In FIG. 10, leafs (terminal nodes) represent single cells, and nodes represent relevant anatomical structures. For each of the single cells the cellular compartments are specified in terms of nucleus, cytoplasm and associated membrane.

Exemplary Computing Device Programmed to Implement Exemplary Embodiments

Systems and methods disclosed herein may include one or more programmable processing units having associated therewith executable instructions held on one or more non-transitory computer readable media, RAM, ROM, hard drive, and/or hardware. In exemplary embodiments, the hardware, firmware and/or executable code may be provided, for example, as upgrade module(s) for use in conjunction with existing infrastructure (for example, existing devices/processing units). Hardware may, for example, include components and/or logic circuitry for executing the embodiments taught herein as a computing process.

The term "computer-readable medium," as used herein, refers to a non-transitory storage hardware, non-transitory storage device or product or non-transitory computer system memory that may be accessed by a controller, a processor, a microcontroller, a computational system or a module of a computational system to encode thereon computer-executable instructions or software programs. The "computer-readable medium" may be accessed by a computational system or a module of a computational system to retrieve and/or execute the computer-executable instructions or software programs encoded on the medium. The non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM) and the like.

Figure 11:
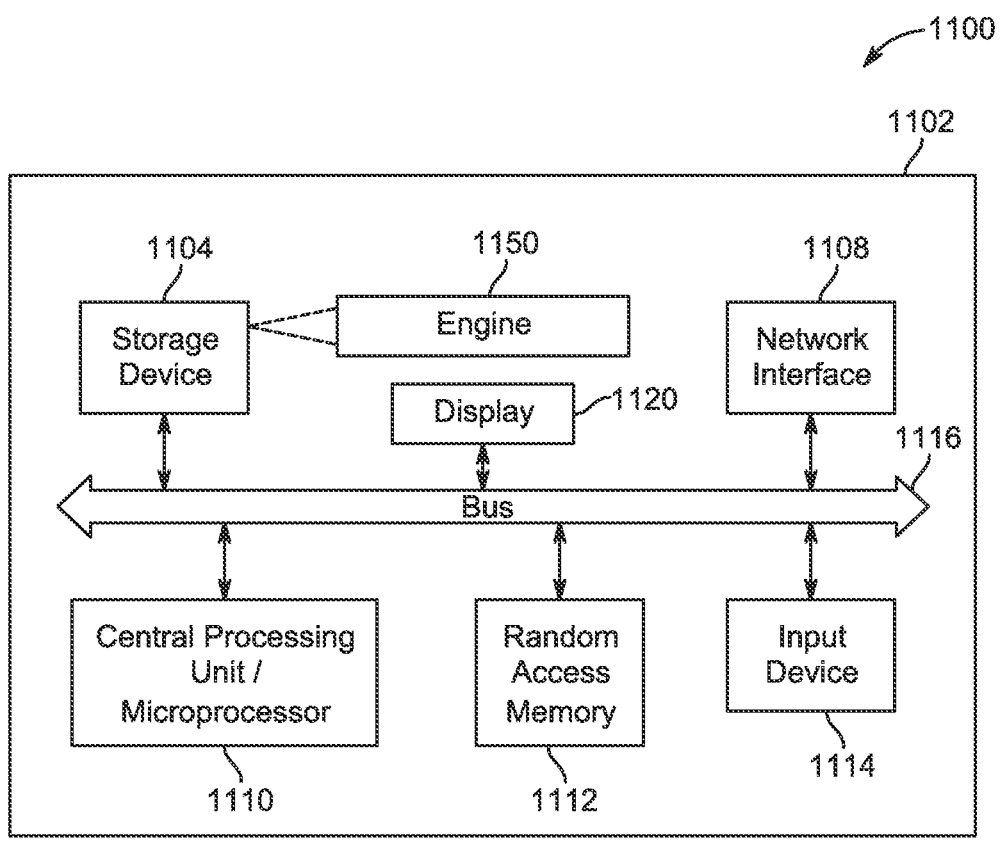
FIG. 11 is a diagram showing hardware and software components of an exemplary system capable of performing the processes of the present disclosure.

FIG. 11 is a diagram showing hardware and software components of an exemplary system 1100 capable of performing the processes described herein. The system 1100 includes a computing device 1102, which can include a storage device 1104, a network interface 1108, a communications bus 1116, a central processing unit (CPU) 1110, e.g., a microprocessor, and the like, a random access memory (RAM) 1112, and one or more input devices 1114, e.g., a keyboard, a mouse, and the like. The computing device 1102 can also include a display 1120, e.g., a liquid crystal display (LCD), a cathode ray tube (CRT), and the like. The storage device 1104 can include any suitable, computer-readable storage medium, e.g., a disk, non-volatile memory, read-only memory (ROM), erasable programmable ROM (EPROM), electrically-erasable programmable ROM (EEPROM), flash memory, field-programmable gate array (FPGA), and the like. The computing device 1102 can be, e.g., a networked computer system, a personal computer, a smart phone, a tablet, and the like.

In exemplary embodiments, exemplary embodiments of an engine 1150 programmed to implement one or more processes described herein, can be embodied as computer-readable program code stored on one or more non-transitory computer-readable storage device 1104 and can be executed by the CPU 1110 using any suitable, high or low level computing language, such as, e.g., Java, C, C++, C#, .NET, Python, and the like. Execution of the computer-readable code by the CPU 1110 can cause CPU 1110 to implement an exemplary embodiment of one or more processes described herein.

For example, the engine 1150 programmed and/or configured to perform hierarchical image segmentation analysis. In one embodiment the engine 1150 can be programmed and/or configured to implement an embodiment of the process described with respect to FIG. 2 and can generate a graphical or textual representation of the tissue architecture (e.g., FIGS. 9 and 10).

The engine 1150 can be programmed and/or executed to access image data from data storage (e.g., a non-transitory computer-readable medium). The image data can correspond to a multiplexed image of biological tissue that has been sequentially fluorescent stained to manifest expression levels of a plurality of morphological biomarkers in the biological tissue. In some embodiments, the morphological biomarkers include biomarkers representative of a single type of sub-cellular morphological unit.

The engine 1150 can be programmed and/or configured to determine a measure of expression levels of a biomarker. The measure can be specific to at least one of the one or more sub-cellular morphological units in the one or more cells and can be a mean of the expression levels. The engine 1150 can be programmed and/or configured to perform an image segmentation analysis on the image data based on the biomarker expression levels. The analysis can be used to identify locations and configurations of one or more cells in the biological tissue. For example, the engine 1150 can be programmed to detect individual cell boundaries in the image data using, for example, supervised shape ranking, unsupervised shape ranking, and/or support vector segmentation. The analysis can also be used to identify locations and configurations of one or more sub-cellular morphological units (e.g., nuclei, cytoplasm, and/or membrane) within the one or more detected/identified cells. For example, the engine 1150 can be programmed and/or configured to detect/identify by imposing topological constraints and/or using a probability map to generate a ring-like structure modeling the membrane or the cytoplasm. The expression levels of a biomarker in the one or more sub-cellular morphological units can be automatically determined by the engine 1150 at the level of the sub-cellular morphological units. In some embodiments, the engine 1150 can be programmed and/or configured to perform image segmentation analysis on the image data based on the biomarker expression levels to identify at least one tissue-based region of interest (e.g., a collection of stromal cells or a collection of epithelial cells). The biological tissue sections can be grouped by the engine 1150 based on the expression levels of the biomarker in the sub-cellular morphological units.

In exemplary embodiments, the engine 1150 can be programmed and/or configured to perform an analysis to determine a relationship between expression levels of a biomarker in the one or more sub-cellular morphological units and the configurations of the one or more sub-cellular morphological units.

The engine 1150 can be programmed to render representations of biological units on the display 1120. As one example, the engine 1150 can be programmed and/or configured to render a hierarchical representation of one or more cells, one or more sub-cellular morphological units in the one or more cells, and/or at least one tissue-based region of interest. In some embodiments, pixels of the image data can be associated with a single type of sub-cellular morphological unit in the hierarchical representation using hard segmentation for which each pixel belongs to either: 1) nuclei, 2) membrane, 3) cytoplasm as described herein. In some embodiments, pixels of the image data can be associated with one or more types of sub-cellular morphological unit in the hierarchical representation using soft segmentation for which a pixel can belong to one or more sub-cellular compartments (e.g., nuclei, membrane, cytoplasm). In some embodiments, a pixels of the image data has a first probability that the pixel corresponds to the first type of sub-cellular morphological unit and a second probability that the pixel corresponds to the second type of sub-cellular morphological unit in the hierarchical representation using probability-based segmentation where each pixel has a probability of belonging to either to the nuclei, membrane and cytoplasm. In some embodiments, a pixel of the image data has a first membership value that the pixel corresponds to the first type of sub-cellular morphological unit and a second membership value that the pixel corresponds to the second type of sub-cellular morphological unit in the hierarchical representation.

As another example, the engine 1150 can be programmed and/or configured to render representations of expression levels of a biomarker in an overlaid manner on the representations of the one or more cells and the one or more sub-cellular morphological units in the one or more cells.

In some embodiments, the engine 1150 can be programmed and/or configured to determine one or more segmentation-quality metrics for the one or more cells. The engine 1150 can render the one or more segmentation-quality metrics for the one or more cells on a display in an overlaid manner over the rendering of the one or more cells. In some embodiments, only a subset of cells among the one or more cells having segmentation-quality metrics that satisfy one or more predefined segmentation quality criteria are rendered. Examples of criteria include morphological measurement of the cell such as cell size, elongation, shape and morphological measurements of the sub-cellular compartments such membrane, cytoplasm and nuclei area.

The network interface 1108 can include, e.g., an Ethernet network interface device, a wireless network interface device, any other suitable device which permits the computing device 1102 to communicate via the network, and the like.

The CPU 1110 can include any suitable single- or multiple-core microprocessor of any suitable architecture that is capable of implementing and/or running the disclosed processes, e.g., an Intel processor, and the like. The random access memory 1112 can include any suitable, high-speed, random access memory typical of most modern computers, such as, e.g., dynamic RAM (DRAM), and the like.

Exemplary Client-Server Environment to Implement Exemplary Embodiments

Figure 12:
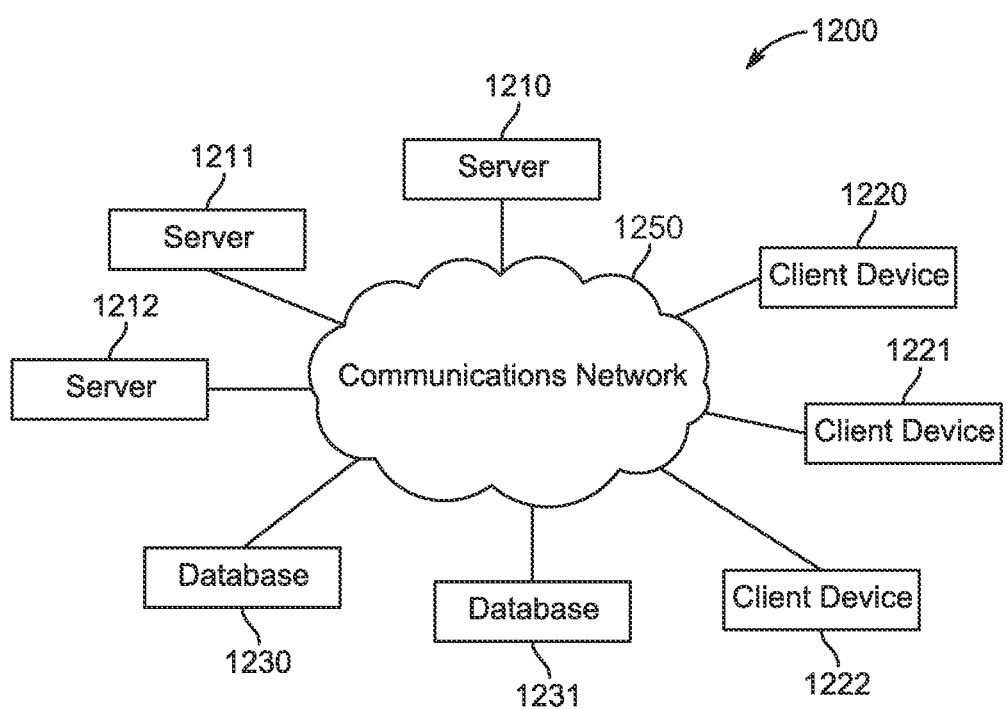
FIG. 12 is an exemplary client-server environment for implementing the systems and methods of the present disclosure.

System and methods disclosed herein can be implemented in a client-server environment. FIG. 12 is an exemplary client-server environment 1200 for implementing the systems and methods disclosed herein. The computing system 1200 includes servers 1210, 1211, 1212 operatively coupled to clients 1220, 1221, 1222, via a communication network 1250, which can be any network over which information can be transmitted between devices communicatively coupled to the network. For example, the communication network 1250 can be the Internet, Intranet, virtual private network (VPN), wide area network (WAN), local area network (LAN), and the like. The environment 1200 can include repositories or databases 1230, 1231, which can be operatively coupled to the servers 1210-1212, as well as to clients 1220-1222, via the communications network 1250. The servers 1210-1212, clients 1220-1222, and databases 1230, 1231 can be implemented as computing devices. Those skilled in the art will recognize that the databases 1230, 1231 can be incorporated into one or more of the servers 1210-1212 such that one or more of the servers can include databases.

In some embodiments, embodiments of the engine 1150 and/or segmentation processes described herein can be implemented by a single device, such as server 1210 or client 1220. In some embodiments, portions of the engine 1150 and/or segmentation processes described herein can be implemented using different devices (e.g., servers, clients, databases) in the communication network 1250 such that one or more of the devices can be programmed and/or configured to implement one or more steps of the segmentation processes. For example, in one embodiment, the multiplexed digital images can be store in the database 1230 and the engine and/or segmentation processes described herein can be executed by the server 1210. A user can access the server 1210 via the client device 1220 to execute the engine and/or segmentation processes described herein. The server 1210 can access the multiplexed images from the database 1230 and can perform an embodiment of the processes described herein to output a hierarchical representation of the biological tissue in the multiplexed image, which can be store, for example, in the database 1231.

Experimental Results

The results of the individual cell analysis in multiplexed images from both Xenograft models and colon tissue samples are presented below. The exemplary systems/methods of the present disclosure have been applied in at least three thousand images, including images of colon cancer and Xenograft models. The results have also been compared to commercial software.

FIG. 13 depicts the results of segmentation of the individual structural markers $T_{Compartments}$. FIGS. 13A-C depict images corresponding to the nuclei (FIG. 13A), membrane (FIG. 13B), and cytoplasm (FIG. 13C). FIGS. 13D-F show an overlay of the raw data 1302 (using cross-hatching to represent the color blue) and the detected compartments 1304 (using cross-hatching to represent the color green).

Figure 13A:
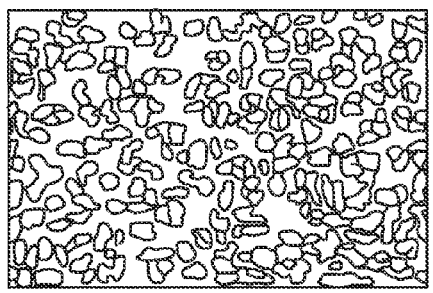
FIGS. 13A-F depicts images of individual cell analysis from Xenograft datasets.
Figure 13D:
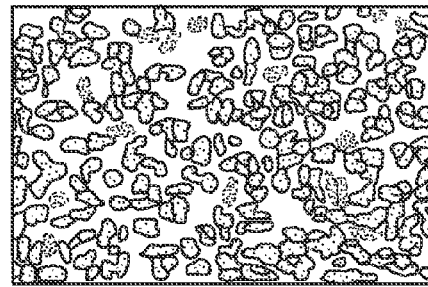
Figure 13B:
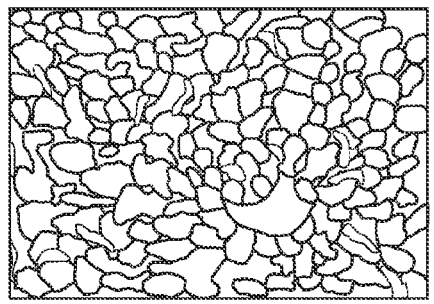
Figure 13E:
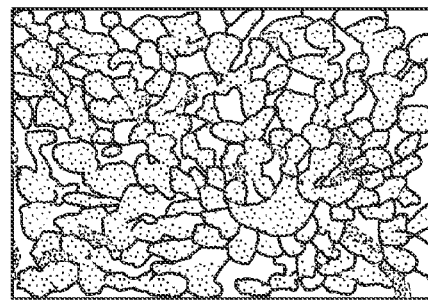
Figure 13C:
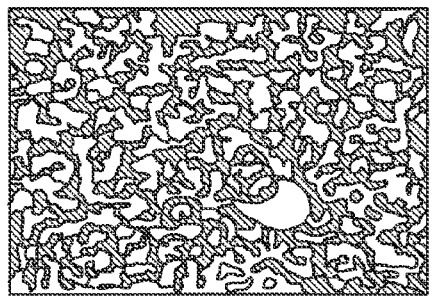
Figure 13F:
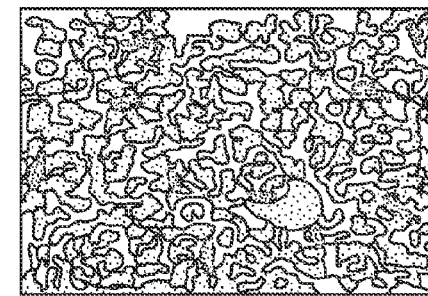

More particularly, FIGS. 13A-C depict nuclei, membrane and cytoplasm images corresponding from Xenograft datasets, respectively. FIGS. 13D-F depict overlays of the segmented nuclei, membrane and cytoplasm (green), with the corresponding image channel (blue), and red lines being the cell boundaries.

Figure 14C:
Figure 14B:
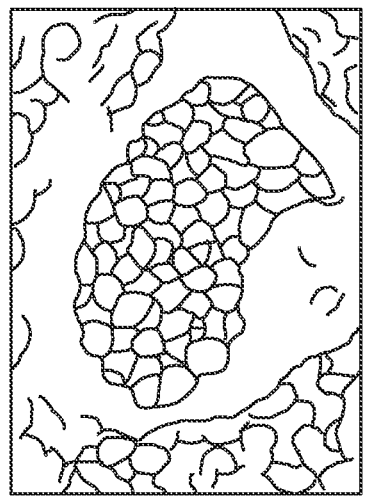
Figure 14A:
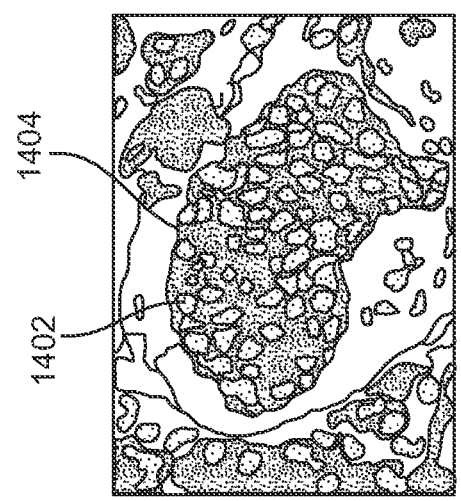

FIGS. 14A-F depict images of the segmentation results of individual cell analysis in the epithelium. FIG. 14A corresponds to the image $T_{Compartments}$, where nuclei 1406, membrane 1402 and cytoplasm 1404, which are represented using cross-hatching correspond to the blue, green and red channel, respectively. FIG. 14B corresponds to the membrane channel, and FIG. 14C corresponds to the detected cells. FIGS. 14E and 14F depict the probability maps corresponding to the membrane and cytoplasm, respectively. FIG. 14C depicts the results of the segmentation at sub-cellular level, where pixels are uniquely associated with a compartmental marker. Nuclei 1406, membrane 1404 and cytoplasm 1402 (FIG. 14C).

More particularly, FIG. 14A depicts the original image corresponding to subjects from prostrate cancer, with the nuclei 1406 (e.g., using cross-hatching to represent the color blue), membrane 1404 (e.g., using cross-hatching to represent the color green) and cytoplasm 1402 (e.g., using cross-hatching to represent the color red) channels overlaid. FIG. 14C depicts detected cell compartments by applying the watershed algorithm, with each color representing an individual cell.

The results of segmentation methods of the present disclosure were compared with those obtained using a customized analysis pipeline utilizing the software Definiens© (Definiens, 2009), where both algorithms were used to segment tissue images in sub-cellular compartments: i) nuclei, ii) membrane, and iii) cytoplasm. The set of images correspond to Xenograft studies.

An exemplary Xenograft study included 13 subjects, and there was an average of 10 images per subject. As discussed below, FIGS. 15A-I and 16A-I were selected as representative samples, where oversaturation was typically present in these datasets. In general, the images of FIGS. 15A-I are less oversaturated as compared to the images in FIGS. 16A-I.

Figure 15C:
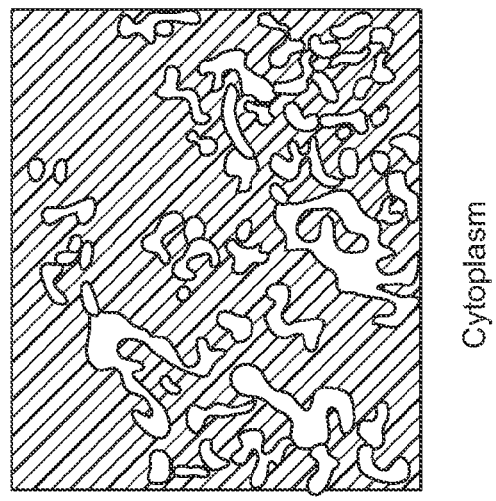
Figure 15B:
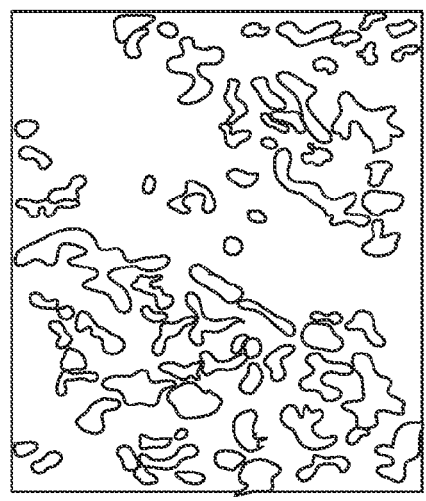
Figure 15A:
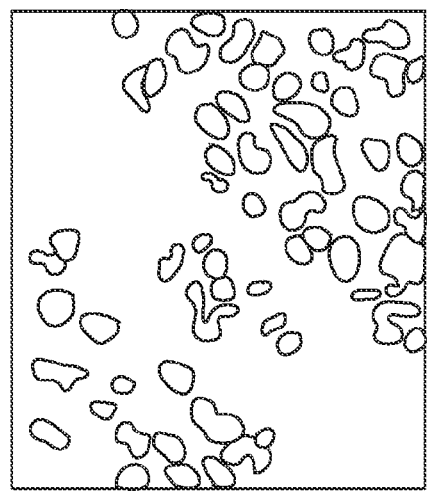

FIGS. 15A-C depict the channels corresponding to nuclei, membrane and cytoplasm. More particularly, FIGS. 15A-C show Xenograft images corresponding to the nuclei, membrane and cytoplasm. Images corresponding to FIGS. 15D-F are the segmentation results according to exemplary embodiments of the present disclosure.

Figure 15F:
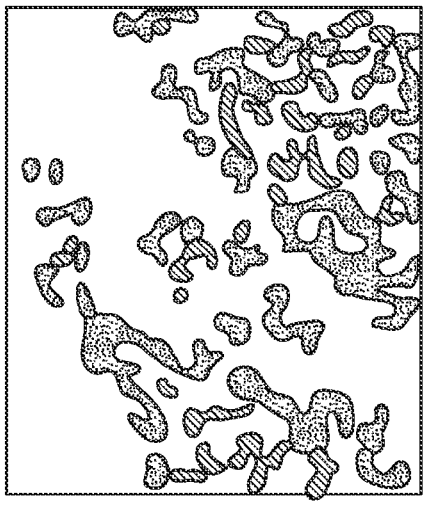
Figure 15E:
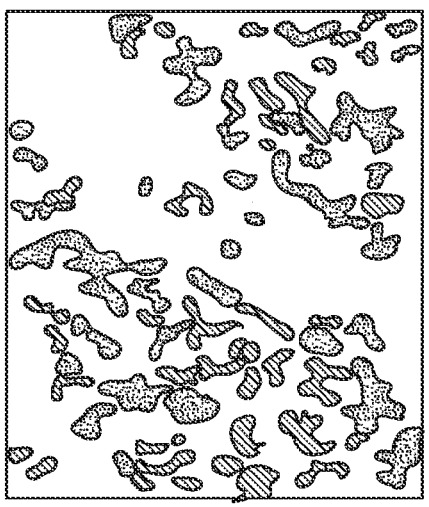
Figure 15D:

To visually compare the segmentation from both algorithms, the segmentation results were color-coded in color images (represented using cross-hatching), and where segmentation results according to the systems/methods of the present disclosure would appear in red, while the results using Definiens©—would appear in green, and regions would appear in yellow are where both algorithms coincide (FIGS. 15D-F). Similarly, images in FIGS. 16A-I show the results of both segmentation algorithms.

FIG. 15G depicts raw data from the study. FIG. 15H depicts single cell segmentation according to systems/methods of the present disclosure and in terms of non-overlapping sub-cellular compartments: nuclei 1502 (e.g., using cross-hatching to represent the color blue), membrane 1506 (e.g., using cross-hatching to represent the color red), and cytoplasm 1504 (e.g., using cross-hatching to represent the color green). FIG. 15I depicts single cell Definiens segmentation: nuclei 1502 (e.g., using cross-hatching to represent the color blue) and membrane 1506 (e.g., using cross-hatching to represent the color green), with the cytoplasm mask not overlaid in this image (see FIG. 15F).

Figure 16C:
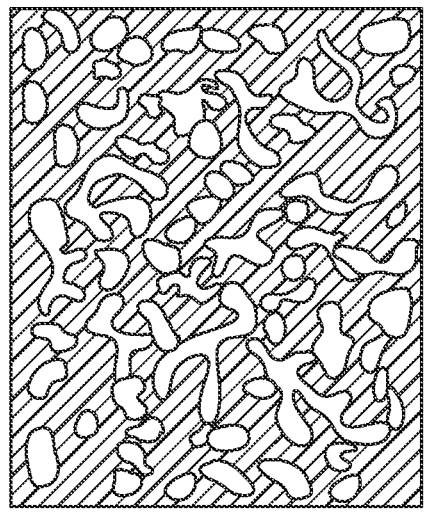
Figure 16B:
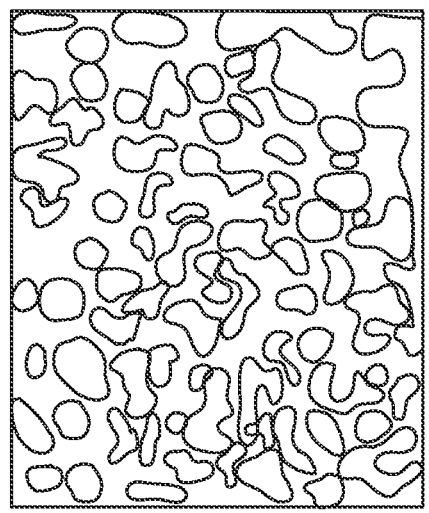
Figure 16A:
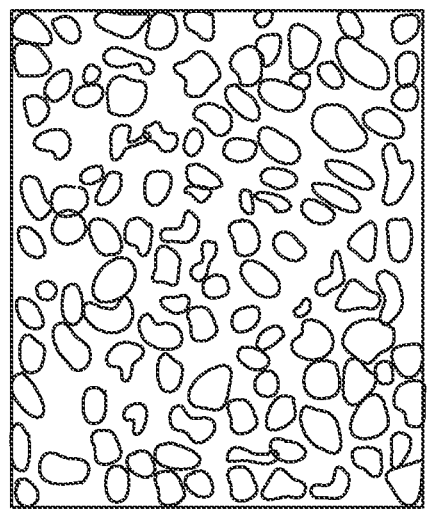
Figure 16F:
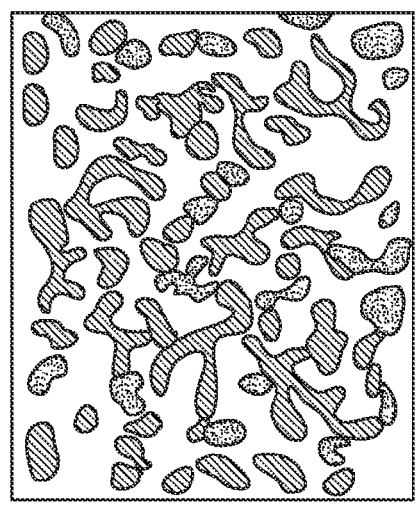
Figure 16E:
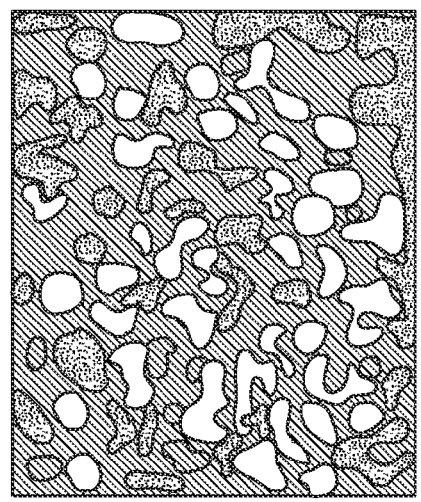
Figure 16D:
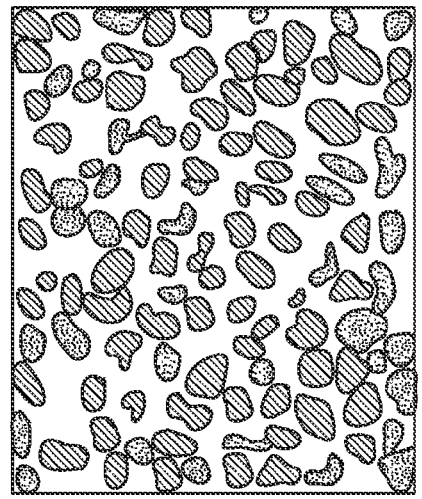

As noted, images in FIGS. 16A-I show the results of both segmentation algorithms. More particularly, FIGS. 16A-C show Xenograft images corresponding to the nuclei, membrane and cytoplasm. Images corresponding to FIGS. 16D-F are the segmentation results according to exemplary embodiments of the present disclosure. To visually compare the segmentation from both algorithms, the segmentation results were color-coded in the color images, and where segmentation results according to the systems/methods of the present disclosure would appear in red, while the results using Definiens© would appear in green, and regions would appear in yellow are where both algorithms coincide (FIGS. 16D-F). FIG. 16G depicts raw data from the study. FIG. 16H depicts single cell segmentation according to systems/methods of the present disclosure and in terms of non-overlapping sub-cellular compartments: nuclei 1602 (e.g., using cross-hatching to represent the color blue), membrane 1606 (e.g., using cross-hatching to represent the color red), and cytoplasm 1604 (e.g., using cross-hatching to represent the color green). FIG. 16I depicts single cell Definiens segmentation: nuclei 1602 (e.g., using cross-hatching to represent the color blue) and membrane 1606 (e.g., using cross-hatching to represent the color green), with the cytoplasm mask not overlaid in this image (see FIG. 16F).

In general, both algorithms significantly disagreed over saturated regions. More specifically, Definens© tended to over segment regions, while the systems/methods of the present disclosure advantageously provided a robust segmentation. For example, the membrane image of FIG. 16B displayed significant over-saturation, thus making it evident in the results obtained by the Definens© software as shown in FIG. 16I. The results of the membrane segmentation using the systems/methods of the present disclosure are shown FIG. 16H, and it is noted how the segmented membrane 1606 (using cross hatching to represent the color red) is not over estimated when intensity saturation is present.

Figure 17A:
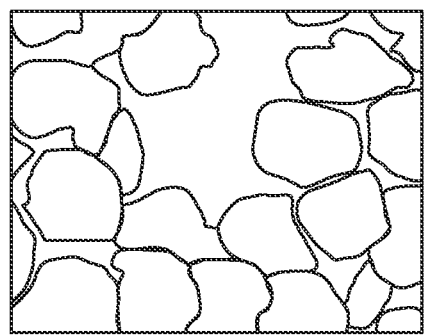
FIGS. 17A-C depict images from a prostrate cancer study according to exemplary embodiments of the present disclosure.
Figure 17B:
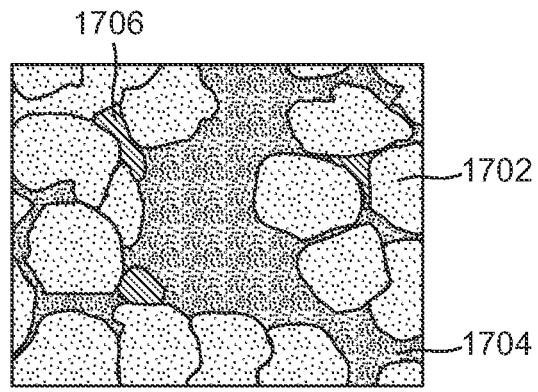
Figure 17C:
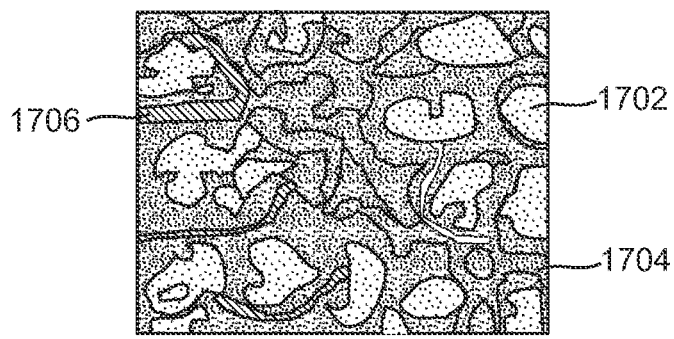

FIG. 17AC displays the results from the tissue section corresponding to colon cancer. FIG. 17A depicts the DAPI channel. FIG. 17B displays the images corresponding to the structural markers $T_{Compartments}$. It is noted that that nuclei images overlap each other, and the protein expression in the membrane is less significant than the protein expression in the cytoplasm. FIG. 17C shows the segmentation results of the systems/methods of the present disclosure, and the nuclei are correctly separated and the membrane detection is correctly detected in the cell borders.

More particularly and with reference to FIGS. 17A-C, it is noted that FIG. 17A displays the nuclei channel. FIG. 17B displays an overlay of the morphological channels: nuclei 1702 (e.g., using cross-hatching to represent the color blue), membrane 1706 (e.g., using cross-hatching to represent the color red) and cytoplasm 1704 (e.g., using cross-hatching to represent the color green). FIG. 17C shows the results of an exemplary single cell segmentation algorithm according to the present disclosure, where the segmented compartments are: nuclei 1702 (e.g., using cross-hatching to represent the color blue), membrane 1706 (e.g., using cross-hatching to represent the color red) and cytoplasm 1704 (e.g., using cross-hatching to represent the color green).

FIGS. 18A and 18B depict overlays 1800 and 1850, respectively, of the results of the segmentation with the corresponding protein expression. Stated another way, FIGS. 18A-B show biomarker expression overlays with the segmented cell showing nuclei 1802, membrane 1806 and cytoplasm 1804 using cross-hatching to distinguish the structures. In this case, pGSK protein expression (FIG. 18A) and Keratin protein expression (FIG. 18B) are shown. It is noted that quantification is performed in the sub-cellular compartments per cell, where each cell is assigned a unique number.

Figure 19:
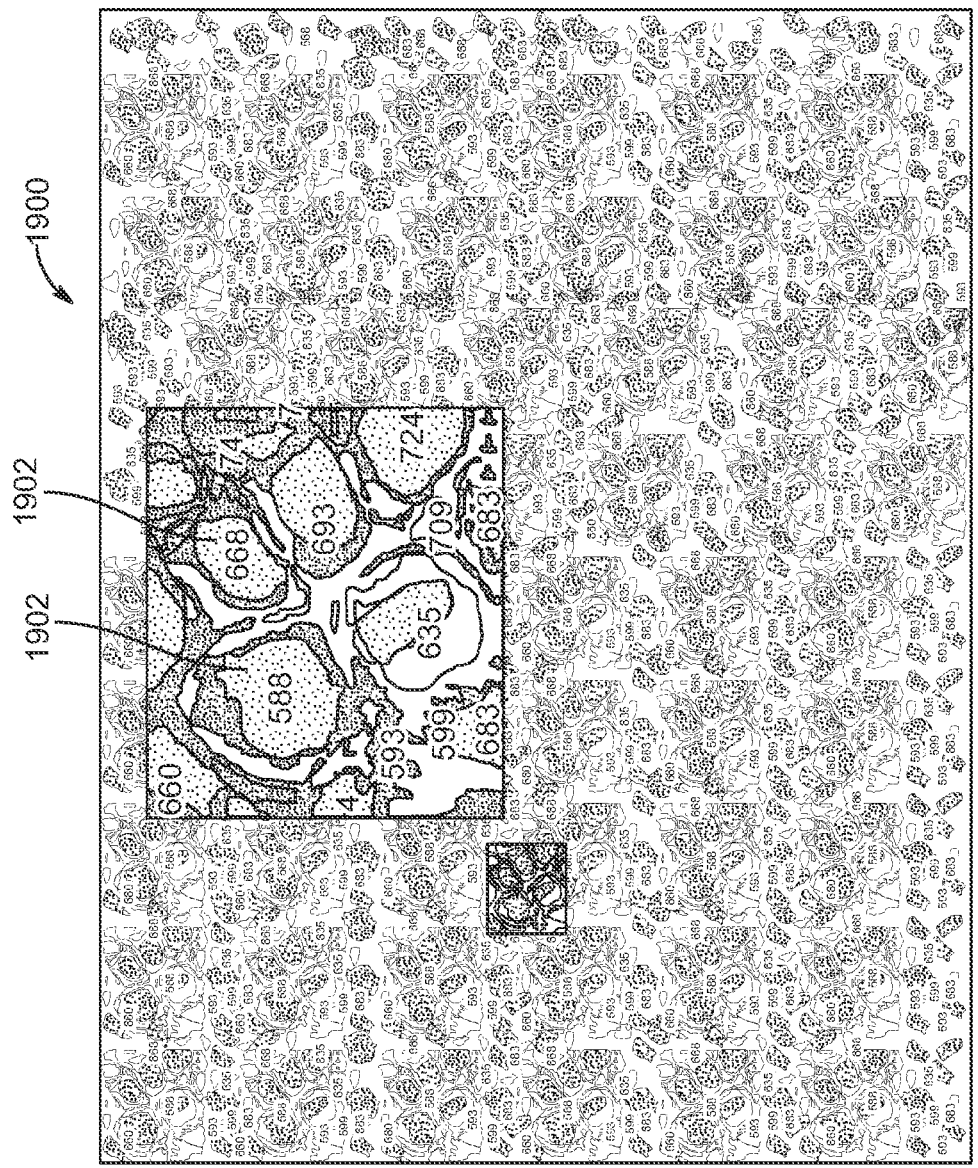
FIG. 19 depicts an image showing the biomarker quantification and localization at the sub-cellular level, according to exemplary embodiments of the present disclosure.

FIG. 19 depicts an image 1900 of the segmented cells in the overall tissue. FIG. 19 is an image showing the results of the segmentation at the sub-cellular level. Each cell is localized in the x-y plane with the corresponding compartments. Detail statistics 1902 per cell are quantified with respect to each cell for every protein. A text file (not shown) can provide a matrix that quantifies the protein expression. More particularly, data can be exported in a text file or the like, where detail statistics 1902 of the protein are estimated in the compartments.

Although the systems, assemblies and methods of the present disclosure have been described with reference to exemplary embodiments thereof, the present disclosure is not limited to such exemplary embodiments and/or implementations. Rather, the systems, assemblies and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the claims be construed broadly and in a manner consistent with the scope of the disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A computer-implemented method for performing multi-channel hierarchical image segmentation analysis of tissue types, cell units and sub-cellular units in biological tissue, the method comprising:
    accessing image data corresponding to multi-channel multiplexed image of biological tissue sequentially fluorescent stained to manifest expression levels of a plurality of morphological biomarkers in the biological tissue;
    performing multi-channel image segmentation analysis on the image data based on the biomarker expression levels to identify locations and configurations of one or more cells in the biological tissue;
    performing multi-channel image segmentation analysis on the image data based on the biomarker expression levels to identify locations and configurations of one or more sub-cellular morphological units within the one or more cells, wherein;
    the one or more sub-cellular morphological units include a membrane or a cytoplasm, and the image segmentation analysis identifies the membrane or cytoplasm by using a probability map to generate a ring-like structure modeling the membrane or the cytoplasm; and
    rendering, on a visual display device, a hierarchical representation of the one or more cells and the one or more sub-cellular morphological units in the one or more cells.

2. The method of claim 1, further comprising:
    automatically determining expression levels of a biomarker in the one or more cellular morphological units at cell level; and
    automatically determining expression levels of a biomarker in the one or more sub-cellular morphological units at the level of the sub-cellular morphological units.

3. The method of claim 2, further comprising:
    automatically grouping a plurality of biological tissue regions based on the expression levels of the biomarker in the sub-cellular morphological units.

4. The method of claim 1, further comprising:
    performing an analysis to determine a relationship between expression levels of a biomarker in the one or more sub-cellular morphological units and the configurations of the one or more sub-cellular morphological units.

5. The method of claim 1, wherein the one or more sub-cellular morphological units comprise one or more nuclei, one or more cytoplasms, and/or one or more membranes.

6. The method of claim 1, further comprising:
    automatically rendering, on the visual display device, representations of expression levels of a biomarker in an overlaid manner on the representations of the one or more cells and the one or more sub-cellular morphological units in the one or more cells.

7. The method of claim 1, further comprising:
    determining a measure of expression levels of a biomarker, the measure being specific to at least one of the one or more sub-cellular morphological units in the one or more cells.

8. The method of claim 7, wherein the measure of the expression levels of the biomarker is a mean of the expression levels.

9. The method of claim 1, wherein the locations and configurations of the one or more sub-cellular morphological units are determined by imposing topological constraints within the cells.

10. The method of claim 1, wherein the plurality of morphological biomarkers include a plurality of biomarkers representative of a single type of sub-cellular morphological unit.

11. The method of claim 1, further comprising:
performing image segmentation analysis on the image data based on the biomarker expression levels and biomarker morphology to identify at least one tissue-based region of interest; and
rendering, on a visual display device, a hierarchical representation of the one or more cells, the one or more sub-cellular morphological units in the one or more cells, and the at least one tissue-based region of interest.

12. The method of claim 11, wherein the one or more sub-cellular morphological units include at least one of cell membranes of the one or more cells, cytoplasms of the one or more cells, and nuclei of the one or more cells; and
rendering, on a visual display device, a hierarchical representation of the one or more cells, the at least one tissue-based region of interest, and the at least one of the cell membranes of the one or more cells, the cytoplasms of the one or more cells, and the nuclei of the one or more cells.

13. The method of claim 11, wherein the at least one tissue-based region of interest includes a collection of stromal cells or a collection of epithelial cells.

14. The method of claim 1, further comprising:
determine shapes of the one or more cells based on the image segmentation analysis identifying the locations and the configurations of the one or more cells; and
generate rankings for the one or more cells, or sub-cellular units based on the shapes of the one or more cells or sub-cellular units, each ranking indicating a probability or similarity that cell boundaries, or sub-cellular units of a corresponding cell or sub-cellular unit are correctly identified by the image segmentation analysis.

15. The method of claim 1, wherein, in the hierarchical representation, a pixel of the image data is associated with a single type of sub-cellular morphological unit.

16. The method of claim 1, wherein, in the hierarchical representation, a pixel of the image data with one or more types of sub-cellular morphological unit.

17. The method of claim 16, wherein, in the hierarchical representation, the pixel of the image data with a first probability that the pixel corresponds to the first type of sub-cellular morphological unit and a second probability that the pixel corresponds to the second type of sub-cellular morphological unit.

18. The method of claim 16, wherein, in the hierarchical representation, the pixel of the image data with a first membership value that the pixel corresponds to the first type of sub-cellular morphological unit and a second membership value that the pixel corresponds to the second type of sub-cellular morphological unit.

19. The method of claim 18, further comprising:
rendering, on the visual display device, the one or more segmentation-quality metrics for the one or more cells in an overlaid manner over the rendering of the one or more cells.

20. The method of claim 18, wherein the rendering of the multi-channel hierarchical representation of the one or more cells includes:
only rendering a subset of cells among the one or more cells having segmentation-quality metrics that satisfy one or more predefined segmentation quality criteria.

21. The method of claim 1, further comprising:
determining one or more segmentation-quality metrics for the one or more cells.

22. The method of claim 1, further comprising performing multi-channel image segmentation analysis on the image data based on the biomarker expression levels to identify locations and configurations of one or more tissue-types in the biological tissue.

23. A computer system for performing multi-channel hierarchical image segmentation analysis of sub-cellular units in biological tissue, the computer system comprising:
a visual display device;
a processing device configured to:
access multi-channel image data corresponding to a multiplexed image of biological tissue sequentially fluorescent stained to manifest expression levels of a plurality of morphological biomarkers in the biological tissue,
perform multi-channel image segmentation analysis on the image data based on the biomarker expression levels to identify locations and configurations of one or more cells in the biological tissue, and
perform image segmentation analysis on the image data based on the biomarker expression levels to identify locations and configurations of one or more sub-cellular morphological units within the one or more cells wherein;
the one or more sub-cellular morphological units include a membrane or a cytoplasm, and wherein the image segmentation analysis identifies the membrane or cytoplasm by using a probability map to generate a ring-like structure modeling the membrane or the cytoplasm; and
a storage device configured to store the locations and configurations of the one or more sub-cellular morphological units within the one or more cells.

24. One or more computer-readable media having encoded thereon one or more computer-executable instructions for performing a method for performing multi-channel hierarchical image segmentation analysis of sub-cellular units in biological tissue, the method comprising:
accessing image data corresponding to a multiplexed image of biological tissue sequentially fluorescent stained to manifest expression levels of a plurality of morphological biomarkers in the biological tissue;
performing multi-channel image segmentation analysis on the image data based on the biomarker expression levels to identify locations and configurations of one or more cells in the biological tissue;
performing multi-channel image segmentation analysis on the image data based on the biomarker expression levels to identify locations and configurations of one or more sub-cellular morphological units within the one or more cells wherein;
the one or more sub-cellular morphological units include a membrane or a cytoplasm, and wherein the image segmentation analysis identifies the membrane or cytoplasm by using a probability map to generate a ring-like structure modeling the membrane or the cytoplasm; and rendering, on a visual display device, a hierarchical representation of the one or more cells and the one or more sub-cellular morphological units in the one or more cells.

* * * * *